US011843268B2

United States Patent
Zeine et al.

(10) Patent No.: US 11,843,268 B2
(45) Date of Patent: Dec. 12, 2023

(54) SYSTEMS AND METHODS FOR WIRELESS SIGNAL TRANSMISSION

(71) Applicant: Ossia Inc., Redmond, WA (US)

(72) Inventors: Hatem Zeine, Woodinville, WA (US); Siamak Ebadi, San Francisco, CA (US)

(73) Assignee: Ossia Inc., Redmond, WA (US)

( * ) Notice: Subject to any disclaimer, the term of this patent is extended or adjusted under 35 U.S.C. 154(b) by 0 days.

(21) Appl. No.: 17/469,174

(22) Filed: Sep. 8, 2021

(65) Prior Publication Data

US 2021/0408832 A1 Dec. 30, 2021

Related U.S. Application Data

(63) Continuation of application No. 16/914,808, filed on Jun. 29, 2020, now Pat. No. 11,146,114, which is a (Continued)

(51) Int. Cl.
*H02J 50/90* (2016.01)
*H02J 50/10* (2016.01)
(Continued)

(52) U.S. Cl.
CPC .......... *H02J 7/00308* (2020.01); *H02J 50/10* (2016.02); *H02J 50/20* (2016.02); *H02J 50/60* (2016.02); *H02J 50/90* (2016.02)

(58) Field of Classification Search
CPC .. H02J 50/10; H02J 50/20; H02J 50/60; H02J 50/90; H04L 5/00; H04B 7/00
See application file for complete search history.

(56) References Cited

U.S. PATENT DOCUMENTS

| 4,870,424 A | 9/1989 | Lalezari et al. |
| 5,982,103 A | 11/1999 | Mosebrook et al. |

(Continued)

FOREIGN PATENT DOCUMENTS

| CN | 102005828 A | 4/2011 |
| CN | 103155353 A | 6/2013 |

(Continued)

OTHER PUBLICATIONS

Chinese Patent Application No. 201680073168.2, Office Action, 9 pages, dated May 25, 2020.

(Continued)

*Primary Examiner* — Rexford N Barnie
*Assistant Examiner* — Joseph N Inge

(57) ABSTRACT

A system includes at least one antenna and a controller. The controller is configured to identify a phase of a first signal received by the at least one antenna from a wireless device. The controller is configured to determine transmission settings for the at least one antenna based on the identified phase. The controller is configured to generate, according to the transmission settings, a second signal for focusing on a wireless device. A method includes identifying a phase of a first signal received by a first transceiver from a second transceiver. The method includes determining transmission settings for the first transceiver based on the identified phase. The method includes generating, according to the transmission settings, a second signal for focusing on the second transceiver. Embodiments improve the power efficiency of wireless signal transmission.

20 Claims, 22 Drawing Sheets

Related U.S. Application Data continuation of application No. 15/293,748, filed on Oct. 14, 2016, now Pat. No. 10,700,556.

(60) Provisional application No. 62/242,248, filed on Oct. 15, 2015.

(51) Int. Cl.
  *H02J 50/20*    (2016.01)
  *H02J 50/60*    (2016.01)
  *H02J 7/00*     (2006.01)

(56) References Cited

U.S. PATENT DOCUMENTS

| | | | |
|---|---|---|---|
| 6,178,140 B1 | 1/2001 | Schlieter | |
| 6,448,490 B1 | 9/2002 | Katz | |
| 6,967,462 B1* | 11/2005 | Landis | H02J 50/80 320/109 |
| 8,008,615 B2* | 8/2011 | Hyde | H02J 50/80 372/38.1 |
| 8,072,380 B2 | 12/2011 | Crouch | |
| 8,310,201 B1 | 11/2012 | Wright | |
| 8,498,658 B2 | 7/2013 | Smith et al. | |
| 9,859,757 B1 | 1/2018 | Leabman et al. | |
| 10,291,055 B1 | 5/2019 | Bell et al. | |
| 2003/0153266 A1 | 8/2003 | Kim et al. | |
| 2003/0220092 A1 | 11/2003 | Hethuin et al. | |
| 2004/0120409 A1 | 6/2004 | Yasotharan et al. | |
| 2005/0136845 A1 | 6/2005 | Masuoka et al. | |
| 2006/0113955 A1* | 6/2006 | Nunally | H02J 50/80 320/108 |
| 2006/0238365 A1 | 10/2006 | Vecchione et al. | |
| 2007/0008132 A1 | 1/2007 | Ballantoni | |
| 2008/0217309 A1 | 9/2008 | Rodgers | |
| 2010/0033021 A1 | 2/2010 | Bennett | |
| 2010/0041349 A1 | 2/2010 | Mahany et al. | |
| 2010/0044123 A1 | 2/2010 | Perlman et al. | |
| 2010/0178919 A1 | 7/2010 | Deepak et al. | |
| 2010/0315045 A1 | 12/2010 | Zeine | |
| 2010/0328073 A1 | 12/2010 | Nikitin et al. | |
| 2011/0103517 A1 | 5/2011 | Hamalainen | |
| 2011/0156640 A1 | 6/2011 | Moslifeghi | |
| 2012/0202435 A1 | 8/2012 | Kim et al. | |
| 2012/0262004 A1 | 10/2012 | Cook et al. | |
| 2012/0274151 A1 | 11/2012 | Kozuma et al. | |
| 2012/0274154 A1* | 11/2012 | DeLuca | H02J 50/27 307/149 |
| 2012/0276854 A1 | 11/2012 | Joshi et al. | |
| 2012/0302297 A1 | 11/2012 | Patel et al. | |
| 2012/0326660 A1* | 12/2012 | Lu | H02J 50/20 320/108 |
| 2013/0002488 A1 | 1/2013 | Wang et al. | |
| 2013/0026981 A1 | 1/2013 | Van Der Lee | |
| 2013/0106661 A1 | 5/2013 | Xiang | |
| 2013/0154892 A1 | 6/2013 | Zeltser et al. | |
| 2013/0273870 A1 | 10/2013 | Shi | |
| 2014/0009108 A1 | 1/2014 | Leabman | |
| 2014/0091626 A1 | 4/2014 | Walley et al. | |
| 2014/0117928 A1 | 5/2014 | Liao | |
| 2014/0217967 A1 | 8/2014 | Zeine et al. | |
| 2014/0241231 A1 | 8/2014 | Zeine | |
| 2014/0268519 A1 | 9/2014 | Huang et al. | |
| 2014/0302869 A1 | 10/2014 | Rosenbaum et al. | |
| 2014/0361735 A1 | 12/2014 | Li et al. | |
| 2015/0022022 A1 | 1/2015 | Zeine | |
| 2015/0171512 A1 | 6/2015 | Chen et al. | |
| 2015/0229133 A1 | 8/2015 | Reynolds et al. | |
| 2015/0340910 A1 | 11/2015 | Petras et al. | |
| 2016/0033254 A1 | 2/2016 | Zeine et al. | |
| 2016/0079799 A1 | 3/2016 | Khlat | |
| 2016/0094092 A1 | 3/2016 | Davlantes et al. | |
| 2016/0156388 A1 | 6/2016 | Zeine et al. | |
| 2016/0345286 A1 | 11/2016 | Jamieson et al. | |
| 2016/0356860 A1 | 12/2016 | Zeine et al. | |
| 2017/0149294 A1 | 5/2017 | Wight et al. | |
| 2017/0201859 A1 | 7/2017 | Banerjea | |

FOREIGN PATENT DOCUMENTS

| | | |
|---|---|---|
| CN | 103477536 A | 12/2013 |
| CN | 104184219 A | 12/2014 |
| CN | 104753131 A | 7/2015 |
| CN | 107276656 A | 10/2017 |
| CN | 107302848 A | 10/2017 |
| JP | 2010-503368 A | 1/2010 |
| JP | 2013-015522 A | 1/2013 |
| JP | 2014-223018 A | 11/2014 |
| JP | 2016-513425 A | 5/2016 |
| JP | 2017-143356 A | 8/2017 |
| JP | 2017-175433 A | 9/2017 |
| KR | 2012-0009929 A | 2/2012 |
| KR | 2017-0093187 A | 8/2017 |
| WO | 2013/069951 A1 | 5/2013 |
| WO | 2013/142720 A1 | 9/2013 |
| WO | 2016/019362 A1 | 2/2016 |
| WO | 2016/109316 A1 | 7/2016 |
| WO | 2017/066629 A1 | 4/2017 |
| WO | 2017/106816 A1 | 6/2017 |
| WO | 2017/189511 A1 | 11/2017 |

OTHER PUBLICATIONS

Chinese Patent Application No. 201780098316.0, Office Action, 16 pages, dated Feb. 9, 2021.
European Patent Application No. 16856309.6, Extended European Search Report, 9 pages, dated Feb. 12, 2019.
European Patent Application No. 17935776.9, Extended European Search Report, 14 pages, dated Jun. 17, 2021.
Hashemi, Homayoun, "The Indoor Radio Propagation Channel," Proceedings of the IEEE, vol. 81, No. 7, pp. 943-968, Jul. 1993.
International Application No. PCT/US2017/068156, International Search Report & Written Opinion, 9 pages, dated Sep. 19, 2018.
Japanese Patent Application No. 2018-518442, Office Action, 9 pages, dated Mar. 12, 2019.
Japanese Patent Application No. 2020-533263, Office Action, 10 pages, dated Jan. 5, 2021.
Korean Patent Application No. 2018-7013673, Office Action, 14 pages, dated Sep. 27, 2019.
Korean Patent Application No. 2020-7019388, Notice of Allowance, 3 pages, dated Feb. 1, 2021.
Saleh, Adel A. M. et al., "A Statistical Model For Indoor Multipath Propagation," IEEE Journal On Selected Areas In Communications, vol. SAC-5, No. 2, pp. 128-137, Feb. 1987.
Japanese Patent Application No. 2022-031612, Office Action, 5 pages, dated Feb. 28, 2023.

* cited by examiner

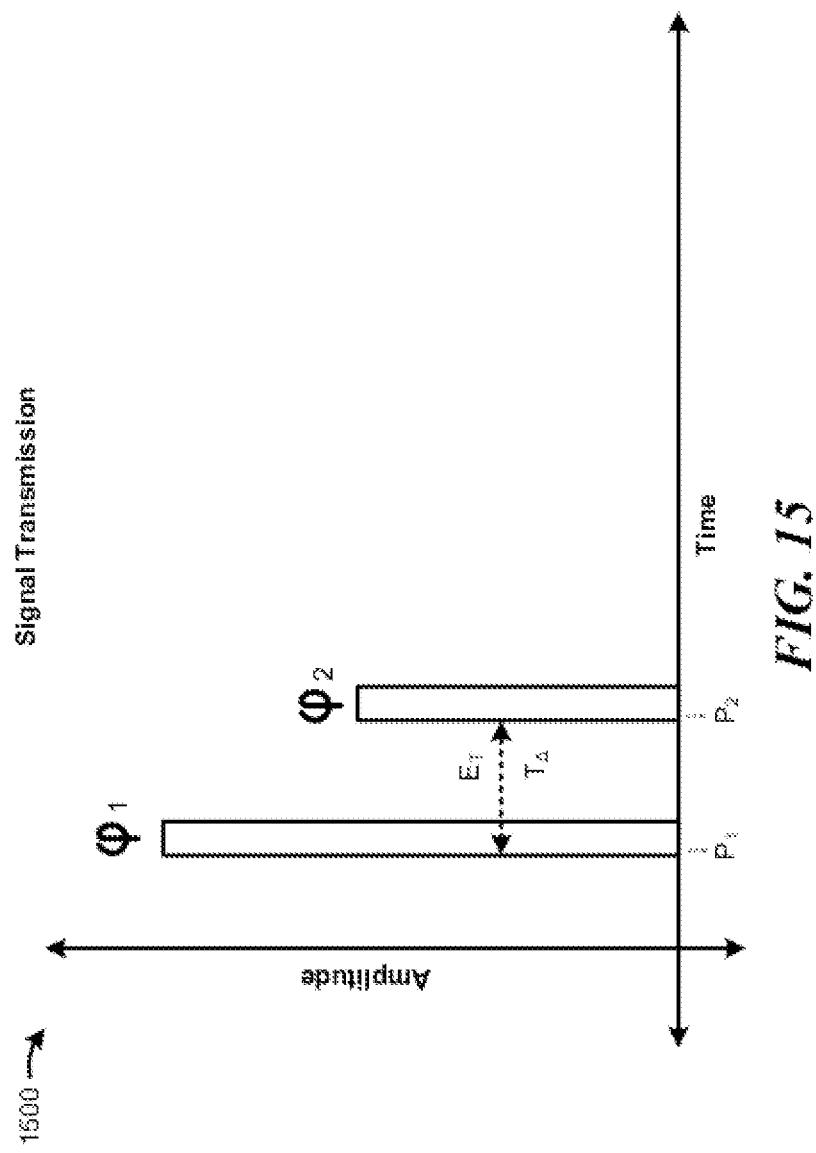

SYSTEMS AND METHODS FOR WIRELESS SIGNAL TRANSMISSION

CROSS-REFERENCE TO RELATED APPLICATIONS

This application is a continuation of U.S. patent application Ser. No. 16/914,808 filed Jun. 29, 2020, and issued as U.S. Pat. No. 11,146,114 on Oct. 12, 2021; which is a continuation of U.S. patent application Ser. No. 15/293,748 filed on Oct. 14, 2016, and issued as U.S. Pat. No. 10,700,556 on Jun. 30, 2020; which claims priority to and benefit from U.S. Provisional Patent Application No. 62/242,248 filed on Oct. 15, 2015, the entire contents of each of which is incorporated by reference herein.

TECHNICAL FIELD

The technology described herein relates generally to improving antenna designs and functioning for wireless charging using radio frequency (RF) signals and, more specifically, to focusing the transmission of pulsed signals from a single transmitting antenna in multipath environments.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for electronics wirelessly.

Magnetic or induction based coupling requires a charger and the receiver to be in relatively close proximity to one another. Wireless charging of devices across a larger distance, however, requires more advanced mechanisms, such as transmission via radio frequency (RF) signals, ultrasonic transmissions, laser powering, etc., each of which present a number of unique hurdles to commercial success.

Regardless of the transmission medium, any time energy is transferred through free space, such as within a residence, commercial building, or other habited environment, it is desirable to limit the exposure levels of the transmitted signals. Power delivery is constrained to relatively low power levels (typically on the order of milliwatts). Due to this low energy transfer rate, it is imperative that a wireless power transmission system be as efficient as possible.

In a free space wireless environment, radiation from an omnidirectional radiator or antenna propagates as an expanding sphere. The power density gets less as the surface area of the sphere increases in the ratio of $1/(r^2)$ where r is the radius of the sphere. This type of radiator is often referred to as isotropic for such an omnidirectional radiation pattern, and it is usual to refer to antennas in terms of their directivity vs. gain as dBi, meaning decibels over isotropic. When the intended receiver of the RF transmission is at a particular point relative to the transmitting radiator, and being able to direct the power towards an intended receiver, it means that more power will be available at the receiving system for a given distance than would have been the case if the power had been omnidirectional radiated. This concept of directivity is very important because it improves the system performance A very simple analog is seen in the use of a small lamp to provide light and the effect of directing the energy using a reflector or lens to make a flashlight where the power is used to illuminate a preferred region at the expense of having little to no illumination elsewhere.

The concept of directional antennas is of the same nature as power which is pointed to a particular region comes at the expense of power that would otherwise have been sent in another direction. A simple example is where a reflector is placed behind a radiating element and effectively nulls any radiation that would have otherwise been present behind the reflector. A classic example of this is seen in satellite dish receiving equipment that has a metal reflector to isolate the antenna not only from the environment behind the reflector, but by careful shaping of the reflector can act like a flashlight lens that focuses the RF signal into a narrow beam in front of the antenna and reflector assembly. This is an example of a highly directional antenna. Directivity is the ratio between total RF signal emitted in the intended direction and the emitted RF signal averaged across all directions. It should be understood that this is not amplification, but a redirection of the signal so that it has the same effect, from the point of view of the receiver, as if the transmitted power level had been increased. As a rider to this consideration, a receiving antenna experiences the same effect of gain simply because RF signals from behind the antenna are reduced or excluded, and that the RF signal is not lost in unwanted noise or interference.

In a typical terrestrial environment, the presence of obstacles adds a complication in that, in addition to the Line of Sight transmissions, signals may bounce from multiple objects each having a slightly different path length. Such propagation along multiple paths is termed "multipath" in the art and is understood to imply that the signal paths or 'rays' are generally of different phase lengths and amplitudes. Reflection may be total as in the case of a good conductor such as a metal obstacle or may be partial as in the case of a less good conductor such as a metallized window covering or a conductive venetian blind. In general, a reflection at a conductor means a 180° phase shift in the tangential component of the reflected wave relative to the incident wave; this satisfies a boundary condition that requires that the voltage at the conductor surface must be zero in the case of a perfect conductor. The combination of signals that arrive at a receive antenna is therefore the sum of all the reflected waves and the direct Line of Sight wave. Addition and subtraction of waves of varying relative amplitudes and phases means that the received signal strength may be commensurately variable and the amplitude of the received signal may show peaks and troughs; a common experience is that the signal is seen to fade and this effect can be very noticeable when moving alongside reflecting surfaces. Drivers in automobiles may experience rapid fading in radio signals that chop in and out so as to produce the "picket fence" effect that varies between a good signal and a noisy signal every few feet on the FM broadcast bands; this is an excellent practical example of a multipath fast fading environment.

One aspect is the effect of polarization (the angle of the electric and magnetic fields that comprise the signal relative to a fixed reference) and especially the consequences of multiple reflections. As a matter of convention in terrestrial applications, the term "vertical polarization" means that the electric field of the signal oscillates vertical relative to the earth's surface. Polarization is very changeable and can be uncontrollable in real world applications and has to be optimized in a more general way. Small antennas tend to be fairly non-directional unless configured into an array of several antennas. Phase information is used to construct the desired plane wave; the more the number of antennas, the better the control of the radiation pattern. It is well known in the art that fading does not correlate well to polarization so an antenna that is orthogonal to another antenna will not see the same fading effects as that latter antenna. An antenna system that is able to receive orthogonal polarizations will benefit from reduced susceptibility to multipath induced fading. This ability to be diverse (diversity reception) means that the summed signal from two or more separate antennas having arbitrary positioning is less likely to exhibit complete RF signal fade.

However, immunity or reduced susceptibility to fading using a diversity system makes this a complicated and costly exercise. A need exists for an alternative, less costly solution.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

Overview

Examples discussed herein relate to a decision service for sharing application data among multiple isolated applications executing on one or more application platforms. In an implementation, a method of focusing pulsed signal transmissions in a multipath wireless power delivery environment is disclosed. The method includes transmitting, from a single transmitting antenna, a pulsed training signal over a plurality of paths to a receiving antenna in the multipath wireless power delivery environment. The pulsed training signal includes at least one signal pulse. The method further includes identifying timing and phase information corresponding to the pulsed training signal as received by the receiving antenna over each of the plurality of paths and configuring transmission settings associated with the transmitting antenna based on the timing and phase information. The transmission settings focus a pulsed wireless power transmission signal for reception by the receiving antenna. The method further includes transmitting the pulsed wireless power transmission signal to the receiving antenna.

In some embodiments, the transmission settings inverse the timing information for simultaneous reception of the pulsed wireless power transmission signal by the receiving antenna over two or more of the multiple paths.

In some embodiments, the transmission settings adjust the phase information for in phase or normalized reception of the pulsed wireless power transmission signal by the receiving antenna over the two or more of the multiple paths.

In some embodiments, the pulsed wireless power transmission signal transmitted over the two or more of the plurality of paths constructively interfere to generate a higher energy 'pulse'.

In some embodiments, the timing and phase information comprising received signals from the training transmission including time of signal arrival, signal amplitude, and signal phase.

In some embodiments, the signals received with an amplitude below a threshold are omitted from the timing and phase information.

In some embodiments, the method further includes retransmitting the pulsed training signal over a second plurality of paths to the receiver antenna after a triggering event, identifying second timing and phase information corresponding to the pulsed training signal as received by the receiving antenna over each of the second plurality of paths, and reconfiguring the transmission settings associated with the transmitting antenna based on the second timing and phase information.

In some embodiments, the pulsed wireless power transmission signal is transmitted for a predetermined amount of time, and wherein the triggering event comprises an expiry of the predetermined amount of time.

In some embodiments, the method further comprises receiving feedback regarding power received at the receiving antenna from the pulsed wireless power transmission signal and comparing the feedback to expected power gains. The triggering event can include the feedback differing from the expected power gains.

In some embodiments, the timing and phase information is received from a wireless power receiver client.

In another implementation, an apparatus is disclosed including one or more computer readable storage media and program instructions stored on the one or more computer readable storage media. The program instruction, when executed by a processing system, direct the processing system to direct a single transmitting antenna to transmit a pulsed training signal over a plurality of paths to a receiving antenna in the multipath wireless power delivery environment. The pulsed training signal includes at least one signal pulse. The instructions further direct the processing system to identify timing and phase information corresponding to the pulsed training signal as received by the receiving antenna over each of the plurality of paths, configure transmission settings associated with the transmitting antenna based on the timing and phase information, wherein the transmission settings focus a pulsed wireless power transmission signal for reception by the receiving antenna, and direct the signal transmitting antenna to transmit the pulsed wireless power transmission signal to the receiving antenna.

In some embodiments, the transmission settings inverse the timing information for simultaneous reception of the pulsed wireless power transmission signal by the receiving antenna over two or more of the multiple paths.

In some embodiments, the transmission settings adjust the phase information for in phase or normalized reception of the pulsed wireless power transmission signal by the receiving antenna over the two or more of the multiple paths.

In some embodiments, the pulsed wireless power transmission signal transmitted over the two or more of the plurality of paths constructively interfere to form an increase in pulse amplitude from the addition of signals.

In some embodiments, the timing and phase information comprising received signals from the training transmission including time of signal arrival, signal amplitude, and signal phase.

In some embodiments, the signals received with an amplitude below a threshold are omitted from the timing and phase information.

In some embodiments, the instructions further direct the apparatus to receive feedback regarding power received at the receiving antenna from the pulsed wireless power transmission signal, compare the feedback to expected power gains, and trigger a recalibration event when the feedback differs from the expected power gains.

In some embodiments, the timing and phase information is received from a wireless power receiver client.

In another implementation, a wireless power transmission system is discussed. The wireless power transmission system includes an adaptively-phased antenna array having multiple radio frequency (RF) transceivers and control circuitry configured to direct a single transmitting antenna of the adaptively-phased antenna array to transmit a pulsed training signal over a plurality of paths to a receiving antenna in the multipath wireless power delivery environment, wherein the pulsed training signal includes at least one signal pulse, identify timing and phase information corresponding to the pulsed training signal as received by the receiving antenna over each of the plurality of paths, and configure transmission settings associated with the transmitting antenna based on the timing and phase information. The transmission settings are configured to focus a pulsed wireless power transmission signal for reception by the receiving antenna. The control circuitry is further configured to direct the signal transmitting antenna to transmit the pulsed wireless power transmission signal to the receiving antenna.

In some embodiments, the transmission settings inverse the timing information for simultaneous reception of the pulsed wireless power transmission signal by the receiving antenna over two or more of the multiple paths.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

One or more embodiments of the present invention are illustrated by way of example and not limitation in the figures of the accompanying drawings, in which like references indicate similar elements.

FIG. 15 depicts an example graph of amplitude over time for a received example transmission in accordance with some embodiments.

DETAILED DESCRIPTION

Figure 1:
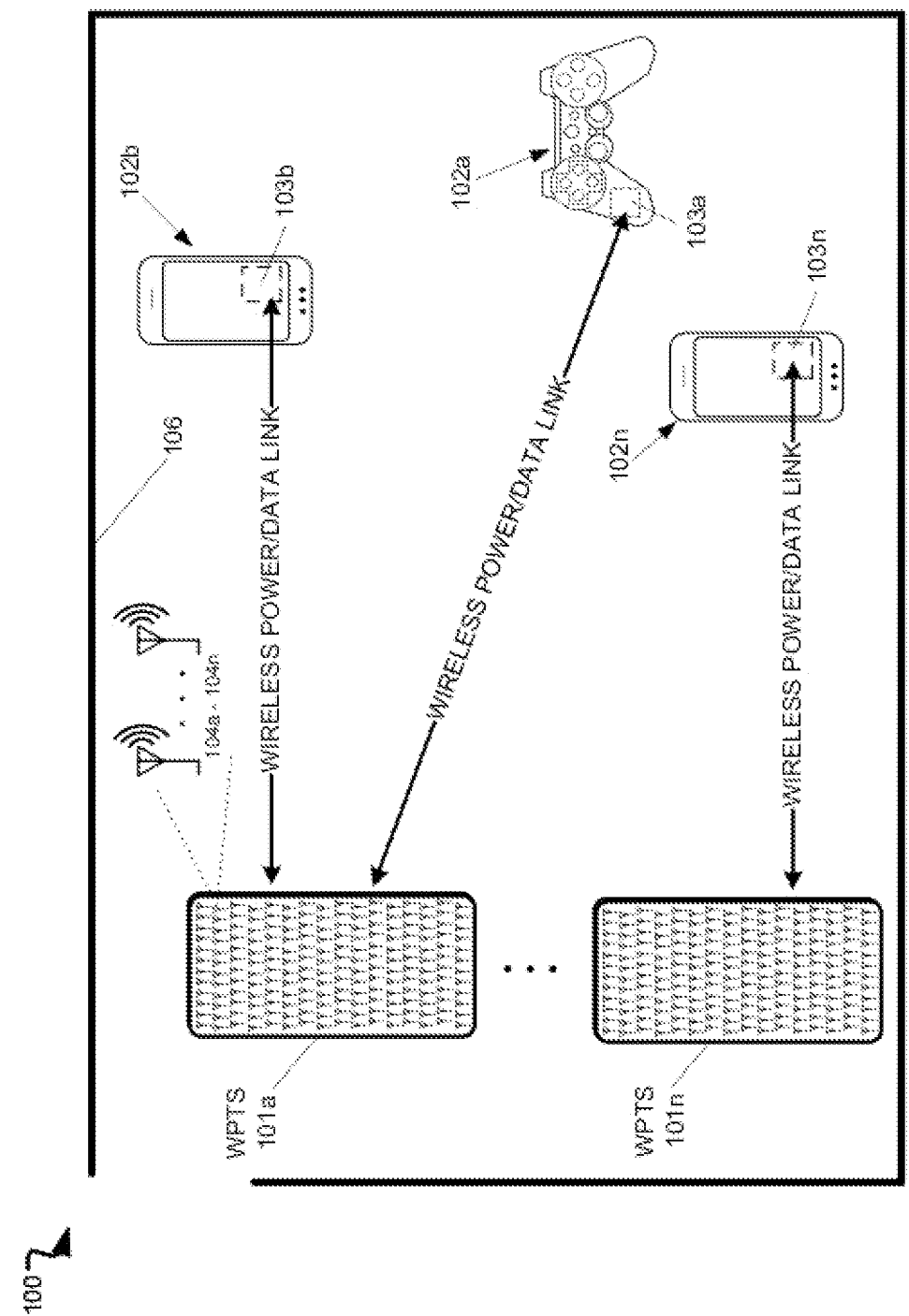
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Any headings provided herein are for convenience only and do not necessarily affect the scope or meaning of the claimed invention.

I. Wireless Power Transmission System Overview/Architecture

FIG. 1 depicts a block diagram including an example wireless power delivery environment 100 illustrating wireless power delivery from one or more wireless power transmission systems (WPTS) 101a-n (also referred to as "wireless power delivery systems", "antenna array systems" and "wireless chargers") to various wireless devices 102a-n within the wireless power delivery environment 100, according to some embodiments. More specifically, FIG. 1 illustrates an example wireless power delivery environment 100 in which wireless power and/or data can be delivered to available wireless devices 102a-102n having one or more wireless power receiver clients 103a-103n (also referred to herein as "clients" and "wireless power receivers"). The wireless power receiver clients are configured to receive and process wireless power from one or more wireless power transmission systems 101a-101n. Components of an example wireless power receiver client 103 are shown and discussed in greater detail with reference to FIG. 4.

As shown in the example of FIG. 1, the wireless devices 102a-102n include mobile phone devices and a wireless game controller. However, the wireless devices 102a-102n can be any device or system that needs power and is capable of receiving wireless power via one or more integrated power receiver clients 103a-103n. As discussed herein, the one or more integrated power receiver clients receive and process power from one or more wireless power transmission systems 101a-101n and provide the power to the wireless devices 102a-102n (or internal batteries of the wireless devices) for operation thereof.

Each wireless power transmission system 101 can include multiple antennas 104a-n, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more receive power clients 103. As illustrated in the example of FIG. 1, power delivery antennas 104a-104n are shown. The power delivery antennas 104a are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each the wireless power transmission systems 101a-101n is capable of determining the appropriate phases for delivering the coherent signals to the power receiver clients 102a-102n. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary alternating current (AC) power supply in a building. Alternatively, or additionally, one or more of the wireless power transmission systems 101a-101n can be powered by a battery or via other mechanisms, e.g., solar cells, etc.

The power receiver clients 102a-102n and/or the wireless power transmission systems 101a-101n are configured to operate in a multipath wireless power delivery environment. That is, the power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the power receiver client.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 103a-103n can each include a data communication module for communication via a data channel. Alternatively, or additionally, the power receiver clients 103a-103n can direct the wireless devices 102.1-102.n to communicate with the wireless power transmission system via existing data communications modules. In some embodiments the beacon signal, which is primarily referred to herein as a continuous waveform, can alternatively or additionally take the form of a modulated signal.

Figure 2:
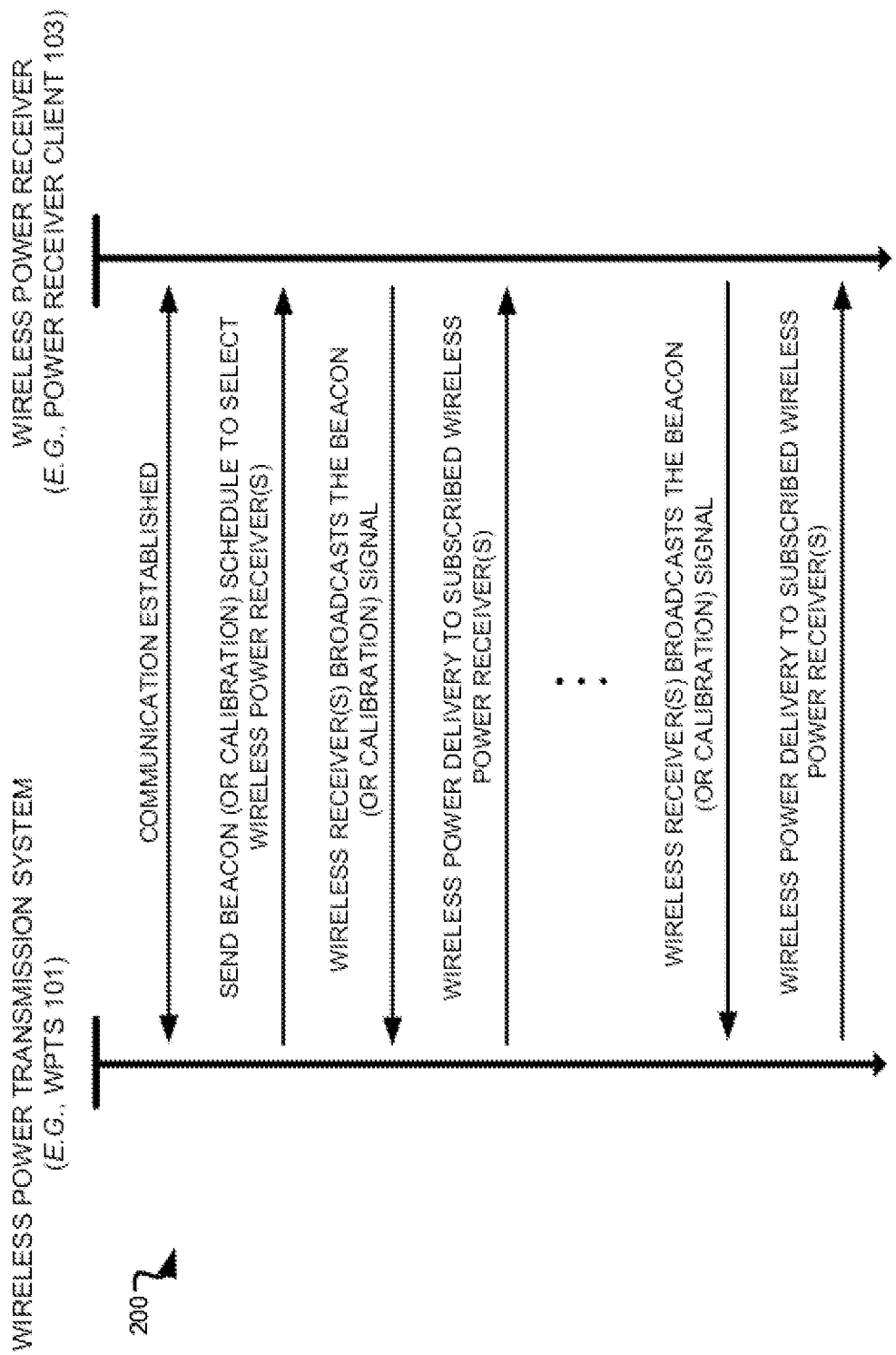
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select power receiver clients 103. The wireless power transmission system 101 can also send power transmission scheduling information so that the power receiver client 103 knows when to expect (e.g., a window of time) wireless power from the wireless power transmission system. The power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 includes one or more antennas (or transceivers) which have a radiation and reception pattern in three-dimensional space proximate to the wireless device 102 in which the power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the power receiver client 103 via the same path over which the beacon signal was received from the power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the client device via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client at the wireless power transmission system and, in turn, responding with wireless power directed to that particular client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
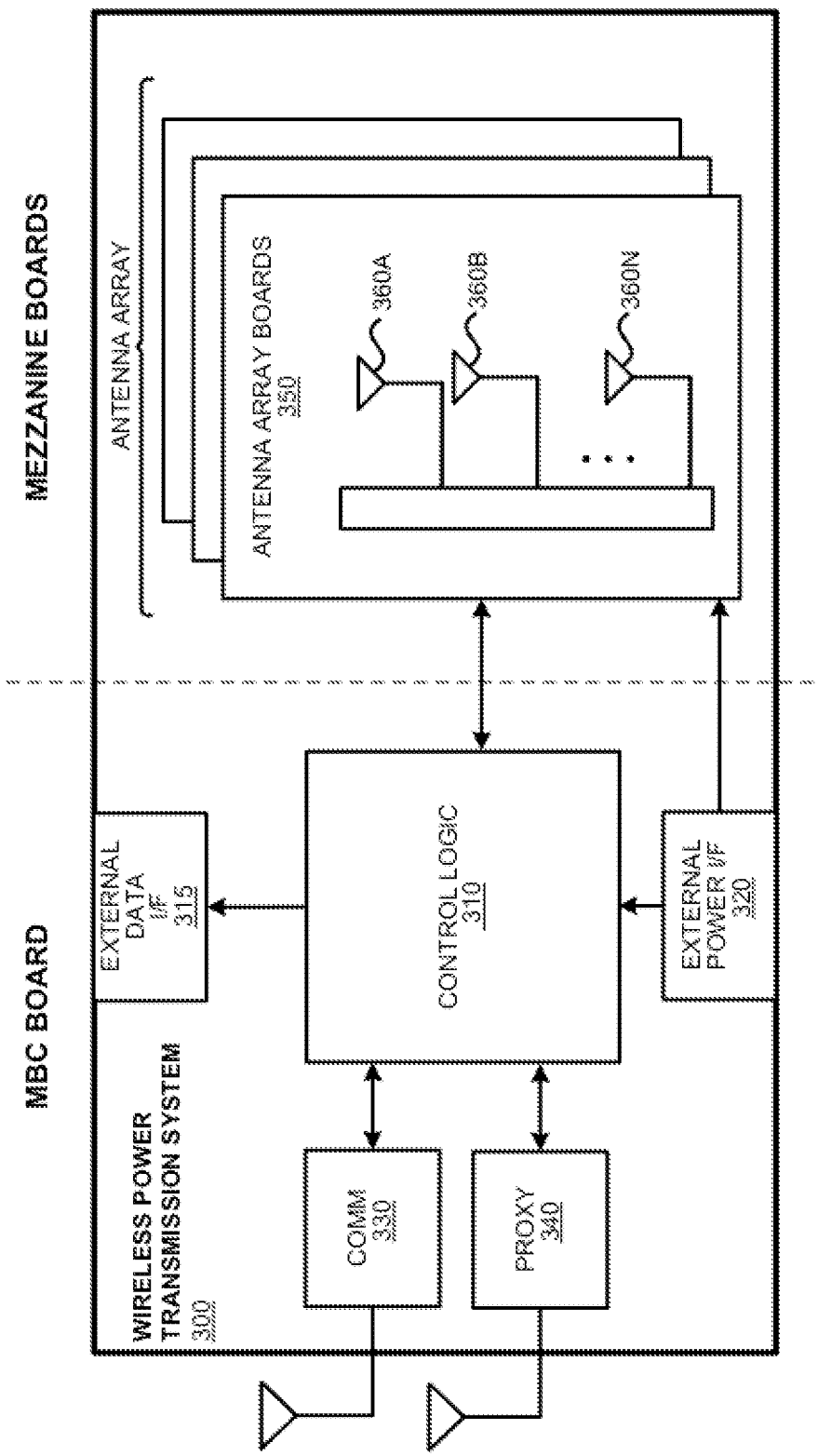
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments, only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™ Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™ ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the master bus controller (MBC), which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
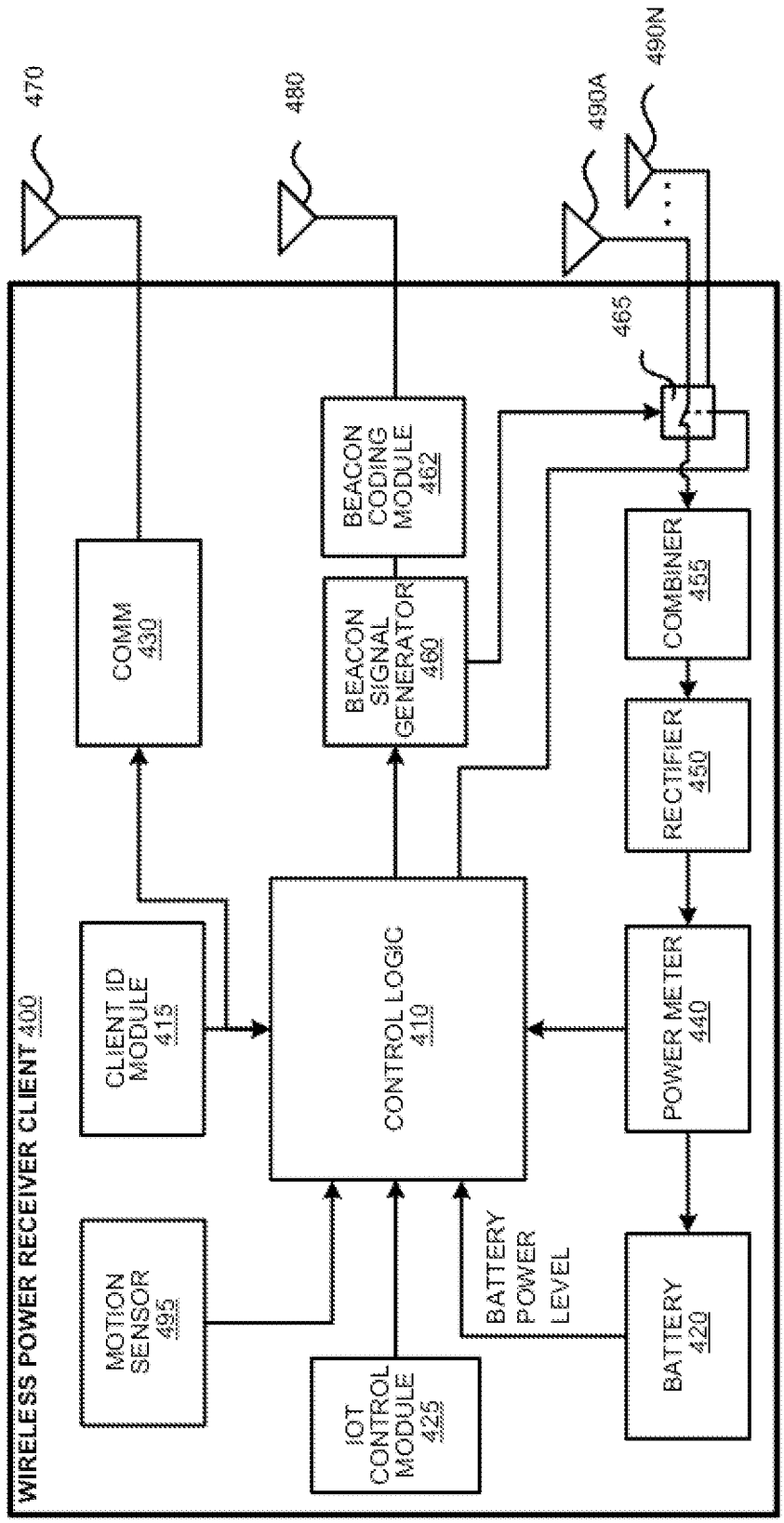
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 can receive and process the battery power level from the battery 420. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client is embedded, usage information of the device in which the wireless power receiver client is embedded, power levels of the battery or batteries of the device in which the wireless power receiver client is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
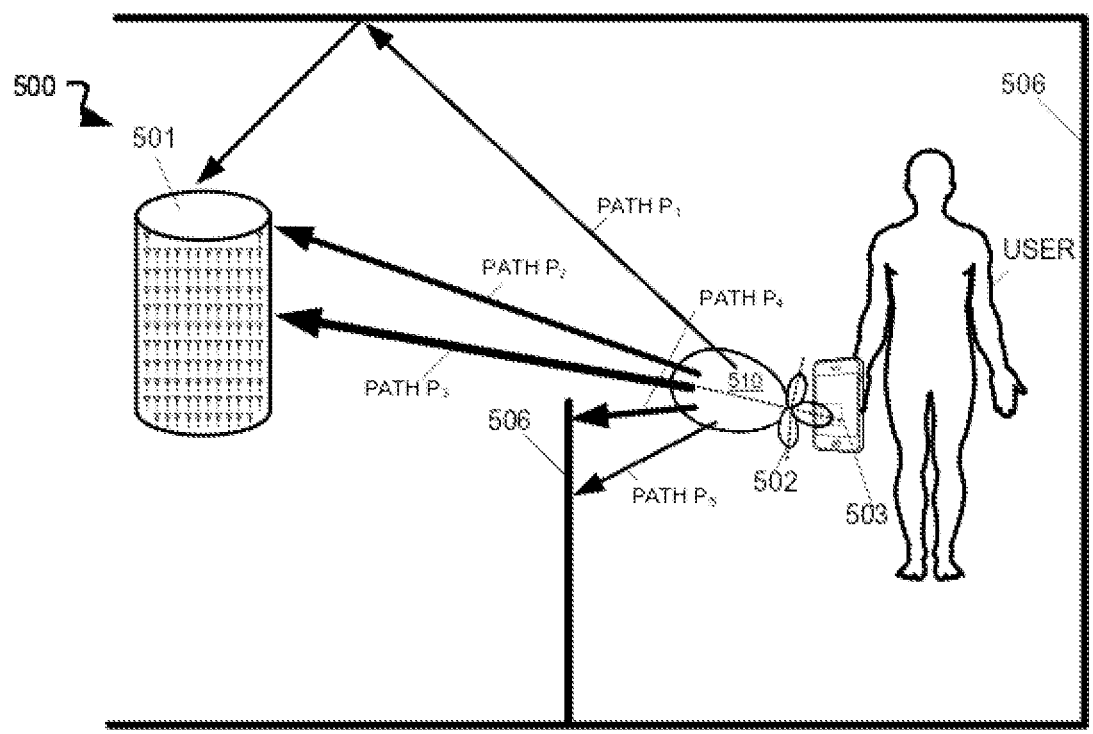
FIGS. 5A and 5B depict diagrams illustrating an example multipath wireless power delivery environment in accordance with some embodiments.
Figure 5B:
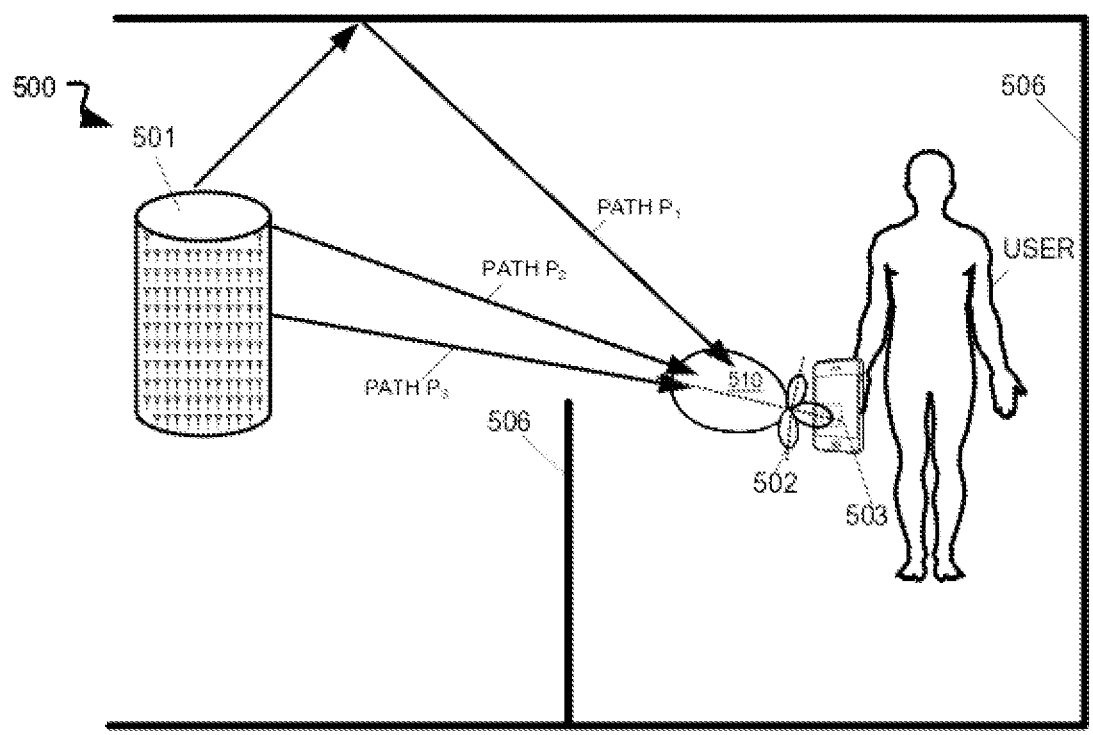

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space adjacent to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transmit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

II. Focusing Pulsed Signal Transmissions

Techniques are described herein for enabling, among other features, more effective wireless charging of devices in wireless power delivery environments through enhanced signal focusing over multiple paths in a multipath wireless power delivery environment. More specifically, the systems and methods discussed herein describe techniques for increasing effective charging of devices, including enhanced ability to focus charging utilizing multiple pathways, phase detection of incoming signals allowing for movement detections and phase synchronization, and directional arrays.

In some embodiments, the techniques discussed herein describe the ability to focus power delivery from a single transmitter by time modulating transmissions such that the power arrives at a single area (or receiving antenna) via multiple paths at approximately the same time and approximately in phase. The signals constructively interfere thereby generating a 'pulse' of higher energy for wireless power delivery. Such systems and methods are referred to herein as single antenna focusing, or focusing via multiple pathways.

In some embodiments, the single antenna focusing using multiple pathways is accomplished by timing signal transmissions and phases of the transmissions such that the different signal transmissions arrive at the receiving antenna at the same time as one another and in phase, such that the signals have constructive interference, thereby increasing the power delivery potential. This is particularly useful when the power delivery is too low to be effective given a continuous transmission, and where a stronger signal (even if short lived) is desired.

In some embodiments, the process of multipath focusing of a transmission begins with sending a training transmission which is received by the receiver over time. The received pulses over time correspond to different pathways taken by the signal, and may vary in phase to one another based upon distance traveled, and number of reflections. The received training transmission data may then be used to generate a power schedule which is essentially the inverse of the received training transmission, both temporally and in terms of signal phase. In this manner the transmitted signals will arrive at the same time, and in generally the same phase.

The signals identified in the transmission schedule may be repeated, and interleaved when possible, in order to ensure that maximum focused power delivery events are possible. In some cases, the power delivered is monitored to ensure that power being delivered meets expectations. If it does not do so, then the training process may be repeated in order to fine tune the transmission schedule. This repetition may result in changes to the charging environment or other errors during the initial training.

Figure 6:
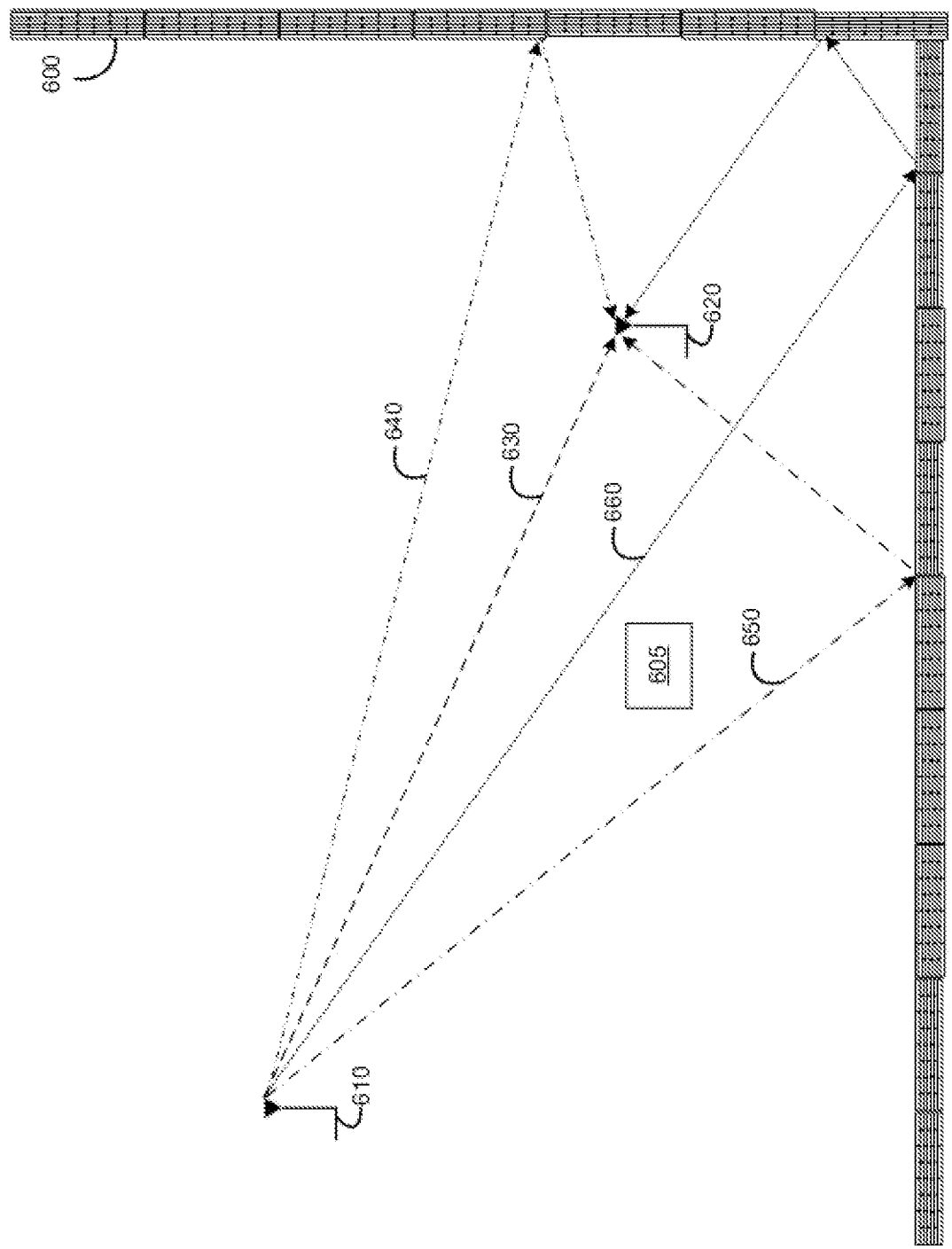
FIG. 6 depicts a diagram illustrating an example of a four pathway wireless transmission, each path has a different length resulting in the signal arriving at a different time and at a different phase and amplitude in accordance with some embodiments.

Turning first to FIG. 6, FIG. 6 represents an example two-dimensional room or enclosure 600 within which focused power is exchanged between two antennas, according to some embodiments. More specifically, within the room or enclosure 600 are shown two antennas, 610 and 620, between which power is exchanged and a representative obstacle 605. By way of example, radiated power from antenna 610 is sent to antenna 620 over four signal paths 630, 640, 650 and 660, respectively. As shown in the example of FIG. 6, path 630 is a direct path between the antennas, paths 640 and 650 have one reflection, and path

660 has two reflections. Four paths are shown for simplicity, it should be appreciated that any number of pathways are possible, some with many more reflections.

Typically, due to signal loss at reflection points, only direct paths, and those paths with relatively lossless or few reflections, are of interest. For ease of discussion, if antenna 610 is isotropic in two dimensions, it should be evident that almost any direction of radiation emanating from the antenna will trace a path, which, after multiple 'bounces' or reflections arrives at the receiving antenna 620. Initially, it is assumed that the reflections are symmetric about the normal to the surface (specular reflection) such that the signal is reflected from and excludes the case where a ray traces its path over and over without arriving at the receiver. The latter rays are not particularly interesting and represent wasted power lost in transmission.

As expected, the shortest path from the transmitter 610 to the receiver 620 is the direct path 630 which exhibits the lowest loss. Other paths are inherently longer, involve at least one reflection, and, in addition to the transmission loss (except in the case where the reflecting surface is a perfect conductor having no loss, e.g., a resistivity of zero), there will also be loss in the reflector itself. The propagation velocity of the signal is relatively constant and so the phase change per unit length will be the same anywhere in the transmission path. For practical purposes, the propagation medium is mostly air and the signal does not pass through any substantial dielectric material so the velocity factor is basically unity.

The propagation velocity is about 30 centimeters per nano-second (very slightly less than 1 foot/ns). For example, if the operating frequency is chosen as 2.43 GHz, approximately the center of the Wi-Fi frequency allocation, the approximate wavelength is 12.35 centimeters. This then allows the calculation of the distance from the sending antenna to the receiving antenna in wavelengths for any given path; since this is an example to show how calculations may be done, liberties are taken with precision so as not to burden the disclosure with numerical complexity at the cost of being understandable.

In the example of FIG. 6, the enclosure 600 where the transmission is occurring is about 21 feet long and 15 feet wide and is representative of a typical living room, waiting room or large single office space. On this scale, the direct path, 630, is represents about 11.5 feet or 350.5 centimeters. With a wavelength of 12.35 centimeters, this is equivalent to 28.38 wavelengths which represents a phase delay of 0.38 wavelengths, or 136.8°. In a similar fashion, each path can be evaluated in terms of its phase delay and yields 30.47 wavelengths for path 640, 42.3 wavelengths for path 650 and 61.9 wavelengths for path 660. These calculations correspond to a phase delay (that fraction of a wavelength that is not a whole integer) of 169.2°, 108° and 324°, respectively.

For purposes of discussion herein, it may be assumed that the propagation of a signal is linear, discounting polarization issues, so that the complexity of the mathematical treatment is not obscured for the benefit of ease of understanding. Although the real world is three dimensional, two dimensional representations are shown for the purposes of explanation. The above example illustrates how a simple calculation may be made to determine the effective path length in terms of a phase delay. The same principles can be applied to a three-dimensional model with a small increase in complexity. The two-dimensional model will not occur in practice so accommodation is made to consider the off axis radiation level that may be achieved either in transmission or reception since, for practical purposes, the antenna may be considered to be a symmetrical component in either direction.

Reflection from a perfect conductor does not involve any loss. However, it does cause a phase reversal of the tangential component of the incident wave at the reflecting surface. Accordingly, a single reflection causes a 180° offset in the perceived phase delay. Given this, it may be difficult to determine, without the path detail, whether the signal is phase shifted due to multiple reflections or if in fact the path length is solely responsible for the measured result. Further, it is well known that the polarizations of the signals are affected at interfaces (considering only the terrestrial effects and ignoring the polarization rotation that occurs during transit through free space due to plasma effects), and although this effect results in multiple reflected signals having arbitrary polarizations, it may generally be ignored. Alternatively, the effect can be accommodated using polarization independent antenna structures.

It is comparatively rare that reflections from walls and objects are loss free and so reflected signals will likely be weaker than those which take a direct path. There are numerous studies that have evaluated the transmission losses of walls of various construction, but few give useful guidance on reflected signal levels because the variability in surfaces is so great. That stated, it has been determined experimentally that a mean attenuation of between 2 and 5 dB is expected at each reflection and since the relative signal level of every received signal is determinable in such systems, the system may discount certain signal paths as being less desirable than others such that transmitting power to the intended power receiver may take advantage of this by avoiding known loss paths.

Although a signal path may not always be reciprocal, because of the effects of polarization rotation and the fact that the environment may have changed, the latter is piecewise static and it may be assumed that for the most part that the propagation from one antenna to another is a reversible process in the short term. This effect is well known and relied upon in many outdoor applications. Power exchange systems though are new, despite the science foundation developed over a century ago; modern technology has overcome many of the limiting factors of materials and size and so these systems have at last become practical.

Figure 7:
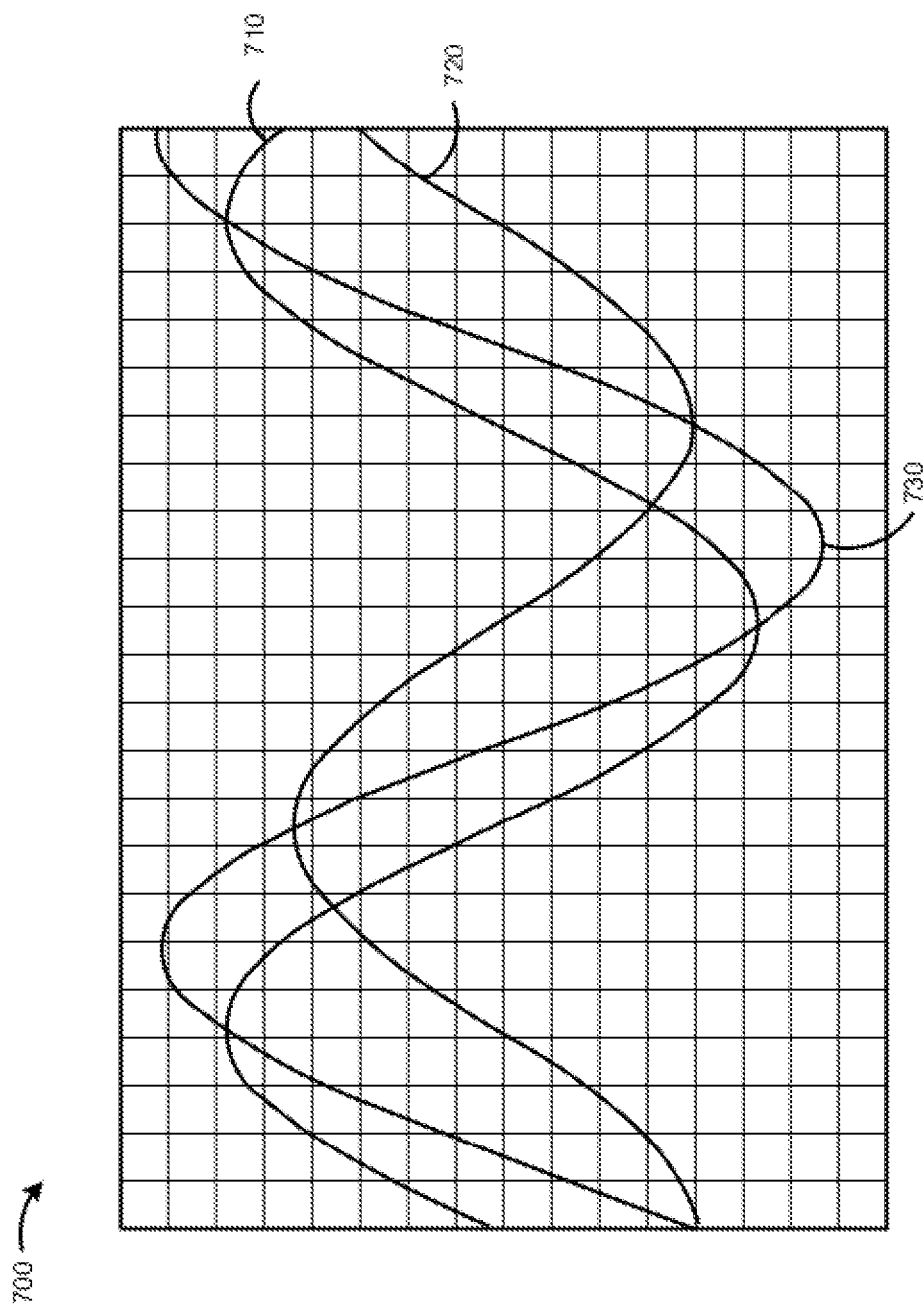
FIG. 7 depicts a diagram illustrating an example wireless charging environment where two sine waves with differing phases are being radiated and their resultant sum in accordance with some embodiments.

Turning now to FIG. 7, the effect of receiving two sinusoids (typical carrier waves are sinusoidal) is shown. In this example illustration, 710 is a sine wave having an amplitude of 4 volts and a 720 is a second sine wave at the same frequency as the first, having an amplitude of 3 volts and a relative phase delay of 90° ($\pi/2$ radians) with respect to 710. The horizontal axis represents time and the vertical axis is shown in voltage above and below zero for ease of use. A linear receiver system would experience the simple sum of these two signals which would be the third sine wave shown, 730. This resultant sine wave is the sum of the amplitudes of the two component waves at each instant in time which yields a sine wave having the same frequency as the first with an amplitude of 5 volts and having a phase lag of $\tan^{-1}(3/4)$ or about 37° relative to the first sine wave.

Figure 8:
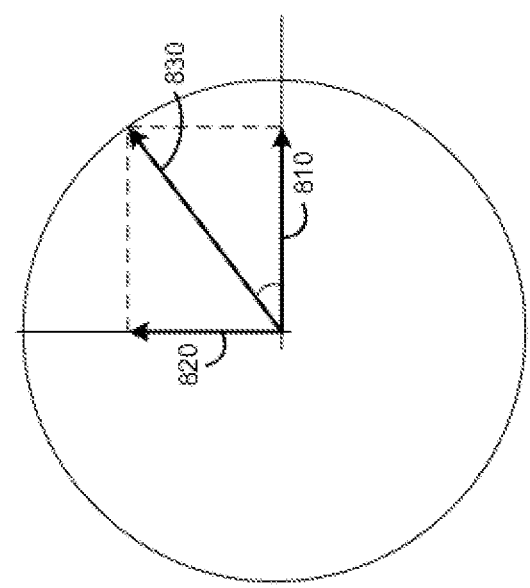
FIG. 8 depicts a diagram illustrating the summing of two phasors in accordance with some embodiments.

FIG. 8 shows an Argand or phasor diagram that explains how these values are arrived at. The reference sine wave, 710, is shown as a phasor of 4 units long and at 0°, 810. The second wave, 720, is shown as a phasor, 820, with a 3-unit length and a relative angle of 90°, representing its phase shift. The resultant wave, 730, is shown as a phasor, 830, which is 5 units long, which from Pythagoras' theorem is $\sqrt{(4^2+3^2)}=5$, and having an angle or phase delay from the reference, 720, of $\tan^{-1}(3/4)$. This simple example can be extended to any number of phasors, each representing a particular path; the length represents the amplitude of the signal and its angle relative to the reference represents its phase delay. It is worth noting that the phase delays repeat every 'revolution' or cycle so that that a phase angle $\varphi$ is indistinguishable from $\varphi+2\pi n$ where n is the number of cycles.

The received signals from paths 630, 640, 650 and 660 shown in FIG. 6 are all at the same frequency and are only distinguished by their phases. Each wave may be represented in exponential form by taking the real part of the complex exponential; recalling that $\exp[j(\omega t+\varphi)]=\cos(\omega t+\varphi)+j\sin(\omega t+\varphi)$; where $\omega$ is the radian frequency $\{\omega=2\pi f\}$, t is the elapsed time and $\varphi$ is the phase offset. More properly this may be written as $0.5 \cdot (\exp[j(\omega t+\varphi)]+\exp[-j(\omega t+\varphi)])$ but the result is the same if noted that the real part is generally implied when represented as a single factor, simply so that the equations do not become overwhelmingly long. Note that adding in the complex conjugate in the latter equation cancels the imaginary parts and doubles the real part due to the addition, so a factor of 2 is used to divide the result to restore the correct value.

In this manner, then, for the four path example of FIG. 8, the equation for a transmitted wave T may be written that would, when transmitted, arrive at the receiving antenna so that all phases were aligned so as to provide the maximum power. Thus, T may be written as $T=\exp[j(\omega t)] \cdot (a \cdot \exp[j(\varphi_1)]+b \cdot \exp[j(\varphi_2)]+c \cdot \exp[j(\varphi_3)]+d \cdot \exp[j(\varphi_4)])$ where a, b, c, and d are the amplitudes of each arriving wave and $\varphi_n$ is the phase of each path. This may be expanded into a trigonometric expression so that the term in parenthesis may be re-written in the form $(a \cdot \cos\varphi_1+ja \cdot \sin\varphi_1+b \cdot \cos\varphi_2+jb \cdot \sin\varphi_2+c \cdot \cos\varphi_3+jc \cdot \sin\varphi_3+d \cdot \cos\varphi_4+jd \cdot \sin\varphi_4)$ where the coefficients a through d represent the amplitudes of the signals received from each of the four paths respectively; these amplitudes are a function of the path loss. It can be seen in this example that a continuous carrier has its amplitude changed by constructive or destructive interference that results from the various phases of these paths. This is the general multipath formulation of the simple example highlighted by FIGS. 7 and 8. It is evident from inspection of this equation that in a multipath environment, there will be certain combinations of path lengths that, without a steerable antenna able to direct the signal along certain paths, may result in very deep signal nulls, or areas where there is minimal to zero signal. It should be noted that antenna directivity is useful in controlling propagation paths. In addition to the primary path, or main lobe of the antenna, there are almost always minor lobes where the radiated signal is far less, although this effect can be used to advantage, it cannot entirely eliminate the effects of reflections within the main lobe of the signal.

By sending instead a series of pulses rather than a continuous carrier, the pulse timing can be arranged so that at some time, there is constructive addition at the receiving antenna. Consider now a simple analog case using a familiar acoustic setting to mimic propagation circumstances in the radio examples. In this example, two corridors are present, with one corridor being short and the other being longer. Common experience teaches that it takes longer for sound to propagate down the longer path than the shorter path. Two loudspeakers or sound sources are positioned so as to launch sound into the corridors respectively and a receiving system observes arriving sound from both corridors. If a brief sound, such as a click or pulse is sent down the longer path followed by a similar click or pulse sent down the shorter path, as the time between the signals is altered so as to make the delay progressively longer, the perceived sound will change from being two distinct clicks when the delay between them is zero, to a single louder click when the delay between transmissions is arranged to be the same as the difference in the time of travel of the waves, so that, from the point of view of the listener both signals are perceived to have arrived at the same time.

This first example is approximately equivalent to having two antennas pointing along each propagation path, each separately excited so as to be able to choose the phase offset so that the received signal is an additive signal comprised of the two separate signals arriving in phase. The time from the beginning of the transmitted pulse to the beginning of the received pulse is seen to be equal to the propagation time of the longer path.

Figure 9:
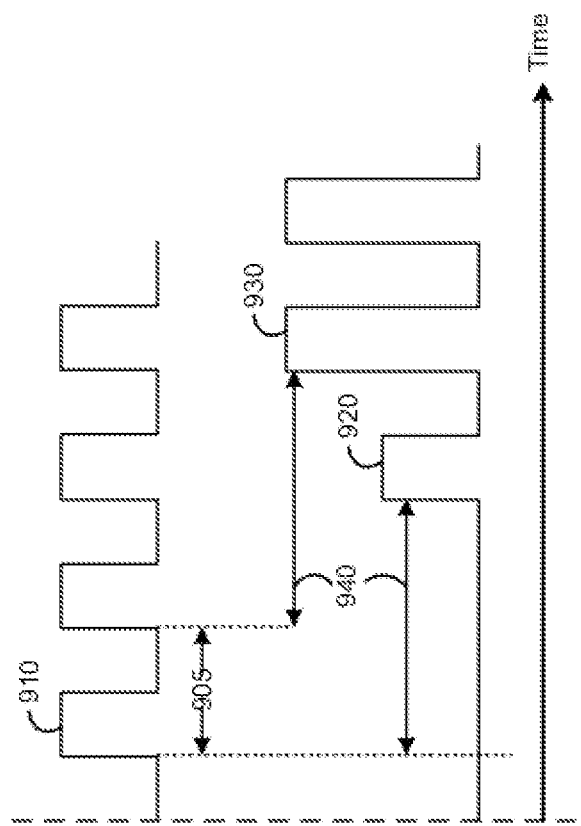
FIG. 9 depicts an example graph of the additive impact of convergent signals in accordance with some embodiments.

FIG. 9 shows a similar example except that now a single acoustic represents the action of a single radiator in the radio example. Neglecting losses, it should be evident that, in the case of a continuous signal, if the longer path is an odd multiple of half wavelengths at the tone frequency, then the signal will be entirely cancelled and the listener will not hear the signal, except for the startup and shut down transient states, once the system has settled to a steady state. However, if a short pulse of energy is sent (a 'click' in audio terms), then a second pulse is sent delayed by the time difference between the two paths that the signal takes to propagate, 905, then the second of the two pulses can be arranged to arrive via the shorter path to correspond to the arrival of the first pulse via the longer path. Now the pulses when aligned appropriately give rise to the sum of the energies received. In this case, the difference in propagation time between the two example paths is shown as 905 and the propagation time via the short path, 920, is shown as 940. It should now be clear that this same sequence may be continued to form a pulse train, 910, with preset spacing between pulses 905 determined so that the received pulses will align and the summed energy recovered. At time 940 after the first pulse is sent, it will be received as 920 via the short path. At a time 940 plus time 905, this same pulse will be received via the long path which will correspond to the receipt of the second pulse in the train 930 sent a time 905 after the first pulse, and so on.

The required pulse train needed in a wireless power transmission environment will not be as simple as in this foregoing two path example. There may be many transmitted paths and these can be determined by receiving them at the transmitter side as a pulse sequence sent from the receiver side and measuring the arrival times of the pulses. The difference between arrival times is now a measure of the propagation paths present and the longest path will be the latest arrival. Since there is no general condition for a multipath environment, we may set a detection threshold and infer that signals below this level offer such a small contribution to the overall transfer of energy that they may be ignored in a practical implementation.

Once a pulse spacing has been determined, from the earliest arrival to the latest, and the pulses are of insufficient amplitude, if any are so categorized, they can be discarded to simplify the process. Then, a pulse train for the transmission of power may be determined so as to appear in phase at the target receiver antenna system. This transmitted pulse train will be a time inverted version of the received set-up transmission from the power receiver so that the latest arrival, being the longest delay, is sent first and the earliest arrival being most likely the direct path is sent last. This sequence may then be repeated as convenient.

Figure 10:
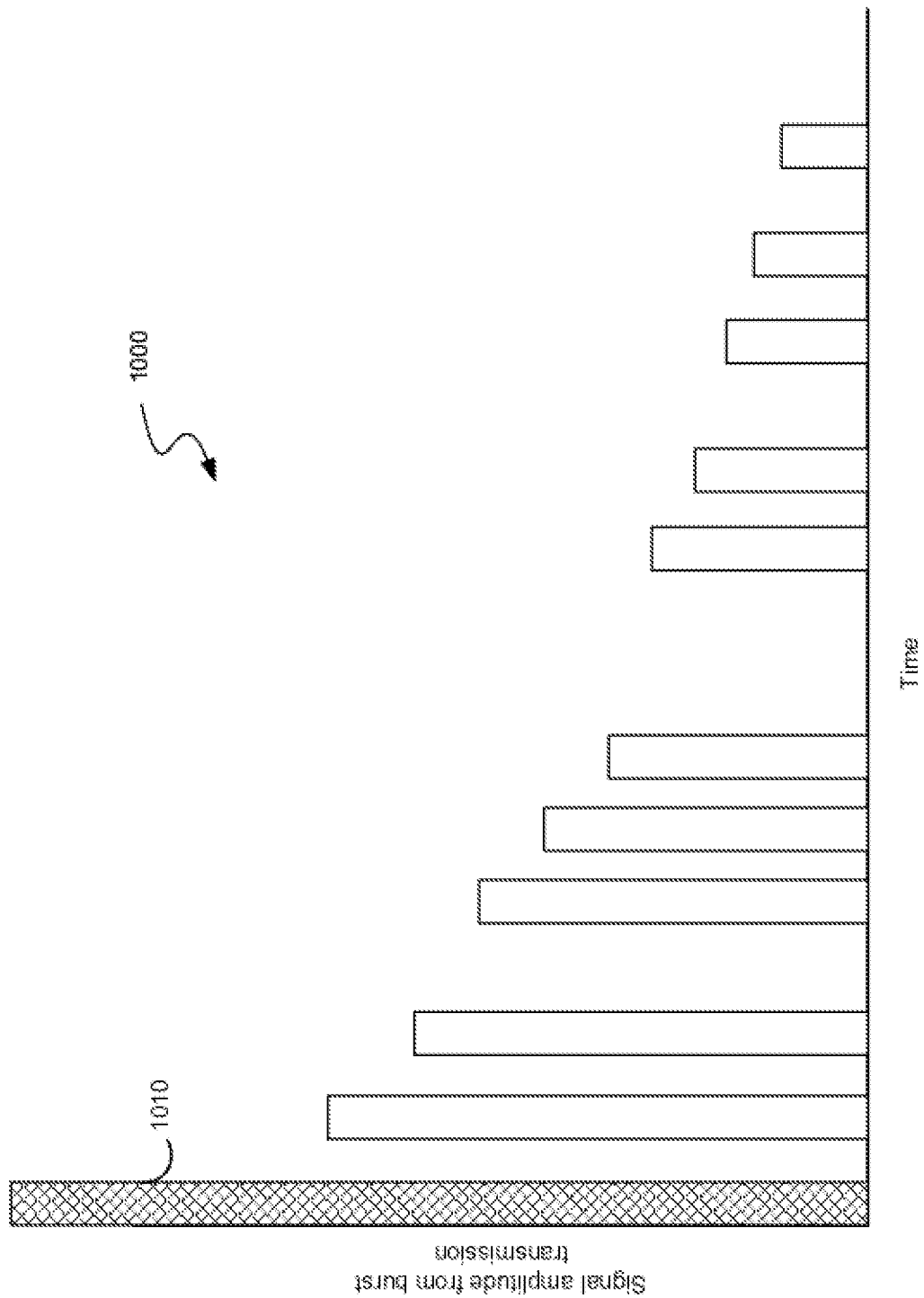
FIG. 10 depicts an example graph of the perceived signal amplitude over time from a burst transmission in accordance with some embodiments.

Turning next to FIG. 10, an example of this mechanism for determining pulse timing is provided. In the example of FIG. 10, a transmitter sends a pulsed signal (shown as the initial transmission block 1010), and the receiver monitors the incoming signal (subsequent non-shaded blocks). For the purpose of this example, the received signal is represented as discrete pulses, however, it is understood that in a wireless environment the actual signal received will typically include significant noise due to the vast numbers of pathways being utilized. Often a single pulse will have both constructive and destructive interference resulting in a received signal that waxes and wanes. However, in general the signal will be typically seen by the receiver as an initial spike (resulting from the direct ray) followed by successively smaller spikes in signal as the rays arrive via alternate pathways. Due to losses through the medium and upon reflection, these successive pulses generally decrease rapidly in amplitude (except in the situation where a constructive interference occurs). By monitoring the timing that the various signals are received, and the relative phases of each received pulse, a schedule for the transmission pulses that will result in an overall signal gain may be generated.

Figure 11:
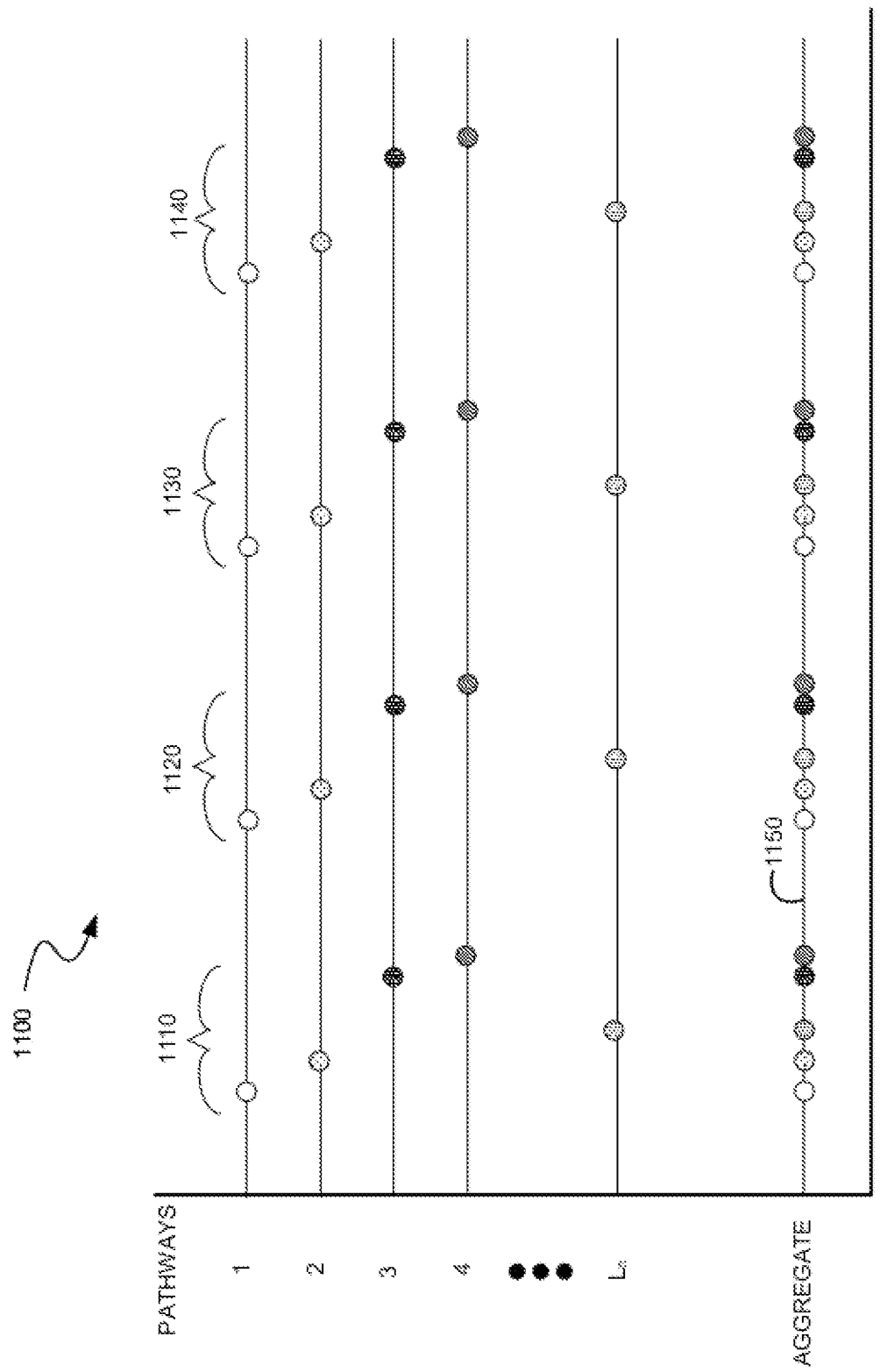
FIG. 11 depicts an example graph of how transmissions may be scheduled for additive impact over multipath transmissions in accordance with some embodiments.

FIG. 11 depicts an example diagram 1100 illustrating an example transmission schedule. As shown, the direct pathway between the transmitter and the receiver is the shortest distance and, thus, in order to arrive at the same time as other signals via longer pathways, the direct pathway is transmitted later in time. In this example diagram pathway 4 is the last pathway where there is a transmission, and would correspond to the shortest pathway. Likewise, pathway 3, Ln, 2 and the 1 represent subsequently longer pathways. Each transmission is indicated as a circle along the horizontal timeline. Each transmission, intended for arrival via a corresponding pathway are appropriately phase shifted in order to ensure that the signals arrive in phase and are able to be summed. Differences in phase are illustrated by a different shading for each transmission. The aggregate of the transmissions is illustrated at 1150 indicating the pulsing activity of the transmitter. Each sequence of pulses, corresponding to 1110, 1120, 1130 and 1140, will result in a single additive power pulse being received. In an ideal environment, virtually all transmitted power could be received without any loss.

Figure 12:
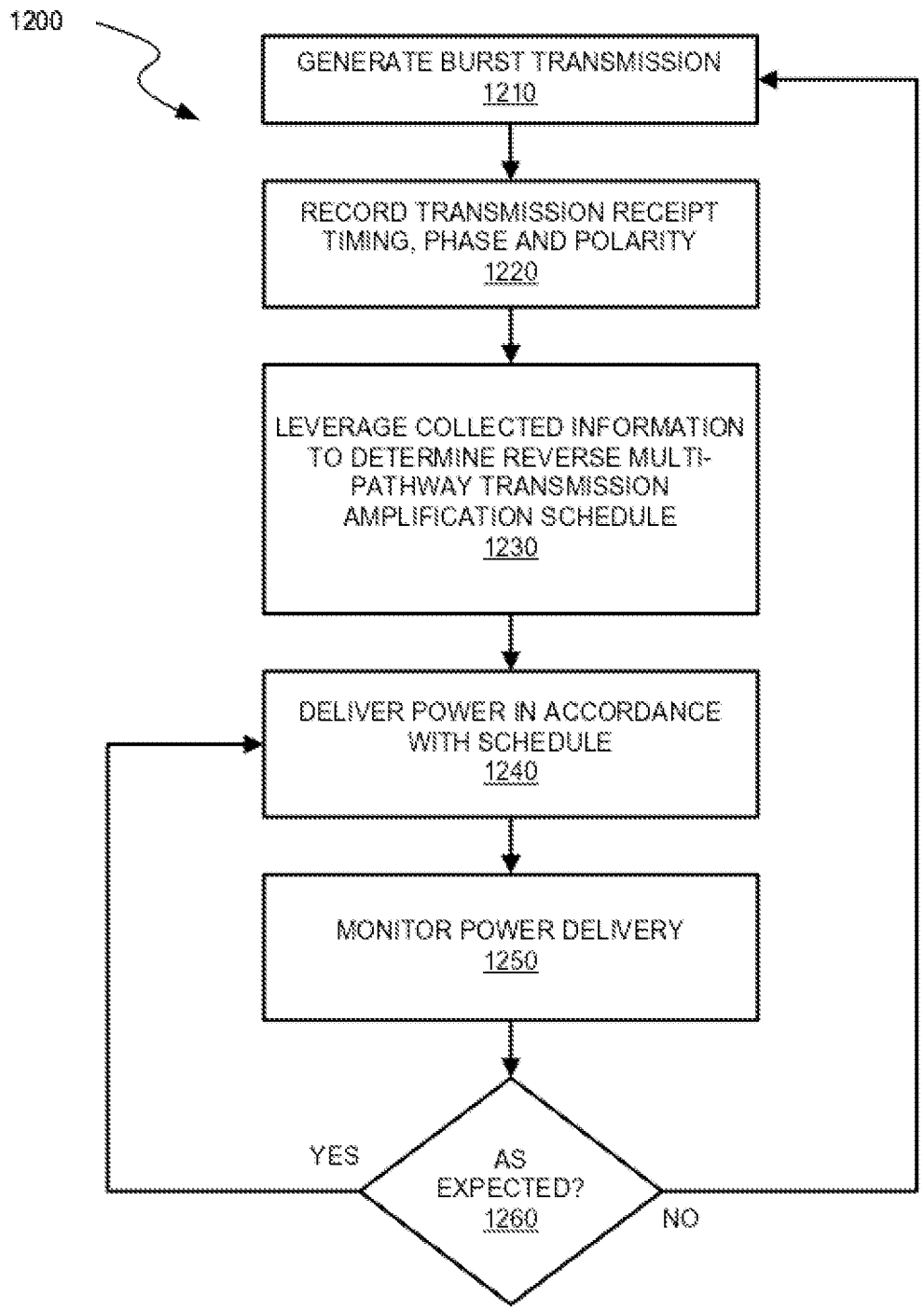
FIG. 12 depicts a flow diagram for an example process of multipath wireless power delivery in accordance with some embodiments.

Moving on to FIG. 12, an example flow diagram 1200 is provided which illustrates a temporal single antenna multipath power delivery amplification process. As discussed herein, initially the transmitter sends a pulsed signal (at 1210). The receiver records the transmission including information such as timing, phase of the received waves, polarity frequency, etc. at 1220. This collected information may be employed to generate a transmission schedule, at 1230, which is the inverse timing of the signal receipt, and phase adjusted such that all the signals are received in phase to one another.

The power is then transmitted in accordance to the generated schedule, at 1240. When possible, the receiver of the power transmission may monitor the delivered power, at 1250, and report back the results to the charger. If the power received continues to be as expected, the power schedule may be repeated indefinitely. However, if the power received is not according to expectations, at 1260, then something within the environment has changed which has resulted in an alteration of the pathway. In such circumstances, a new pulse may be transmitted to update the powering transmission schedule. It should be noted that because the environment is rarely static, in some implementations, set-up transmissions are requested every pre-determined time interval rather than through feedback of power delivered. In some embodiments, intervals are typically between 100 ms and 5 seconds, provided that if an environment proves to be very slow to change, so that more than two set-up sequences are repeated with very similar results, then the time interval between requests for set-up may be increased to reduce power that is being wasted by asking for set-up sequences too frequently.

FIGS. 13-21 depict a series of example transmission scenarios to further illustrate the challenges and solutions made possible via multipath single transmission amplification. One challenge identified is that for a given environment, based upon layout and materials used, may have different properties that allow for transmissions of some frequencies to perform better than others. This phenomenon is true regardless of transmission mechanism. It is known some acoustic signals travel better in a given environment due to resonances and better reflection than other frequencies, just as RF signal impedance is frequency dependent.

Figure 13:
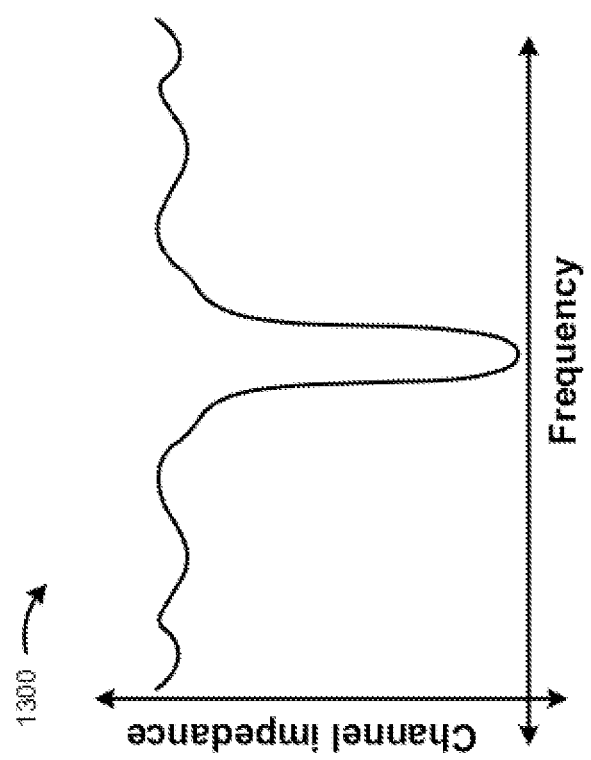
FIG. 13 depicts an example graph of channel impedance versus frequency for some wireless transmission in accordance with some embodiments.

FIG. 13 provides an example illustration of a graph where frequency of the transmitted signal is compared against impedance within the wireless coverage area. It may be noted that within the coverage area, different locations may have different optimal frequencies. Further, as the environment changes (movement, door opening, change in power, etc.) the optimal frequency for transmission may likewise change. As such, the system may undergo periodic frequency tuning where a broad spectrum of signals is transmitted, and impedance feedback is collected. For any given receiver, at any given time, this data may then be employed to optimize transmissions.

Figure 14:
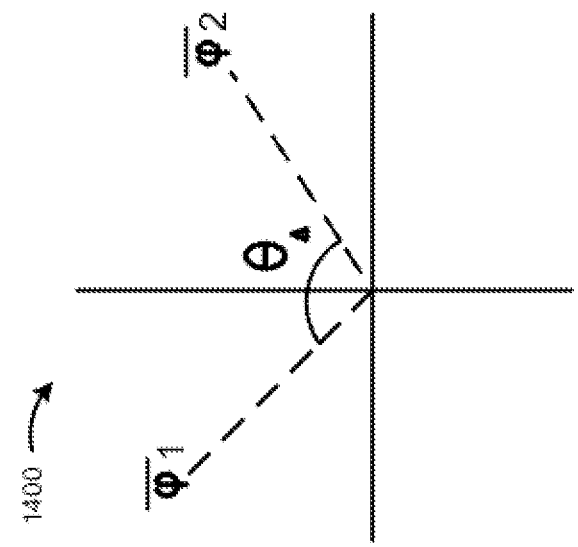
FIG. 14 depicts an example graph of the difference between example phase angles in accordance with some embodiments.
Figure 16A:
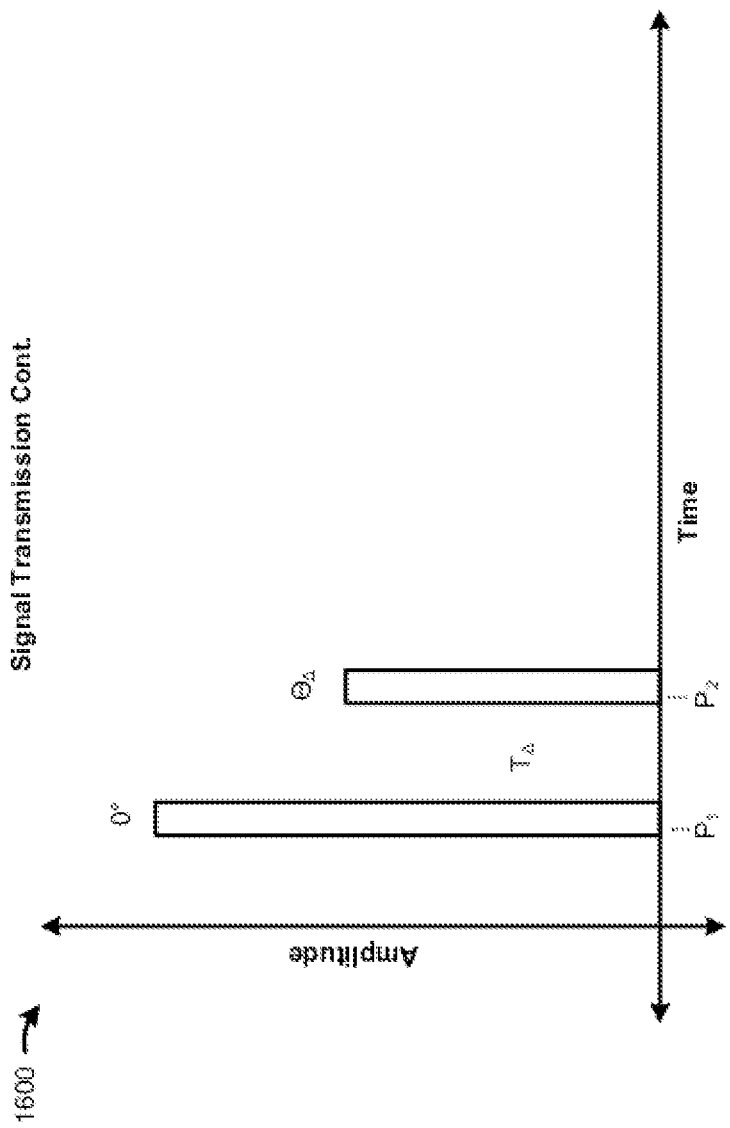
FIGS. 16A and 16B depict example graphs of amplitude over time for a received example transmission in terms of received signal phase in accordance with some embodiments.

Next, in reference to FIG. 14, an example graph is provided for the relative phases of two received transmissions from different paths. The phase differential, indicated here as θ, between the two signals is the result of differences in pathway length and/or number of reflections, as previously discussed. In FIG. 15, these two transmissions are plotted over time in terms of their relative amplitudes. The first transmission through the shorter path results in a signal (P1) received with greater amplitude. The transmission through the second path is possibly lower in amplitude (P2). As the medium the signal is passing through is generally constant, the difference in pathway length may be easily calculated by knowing the speed of signal propagation, and the time differential ($\Delta T$). FIG. 16A leverages these same two transmissions in order to dictate phases of two new pulsed transmissions. By assigning the phase of the first pulse as 0 degrees, and the second as the phase difference (θ) previously discovered, the resulting combined signals will have an additive effect.

Figure 16B:
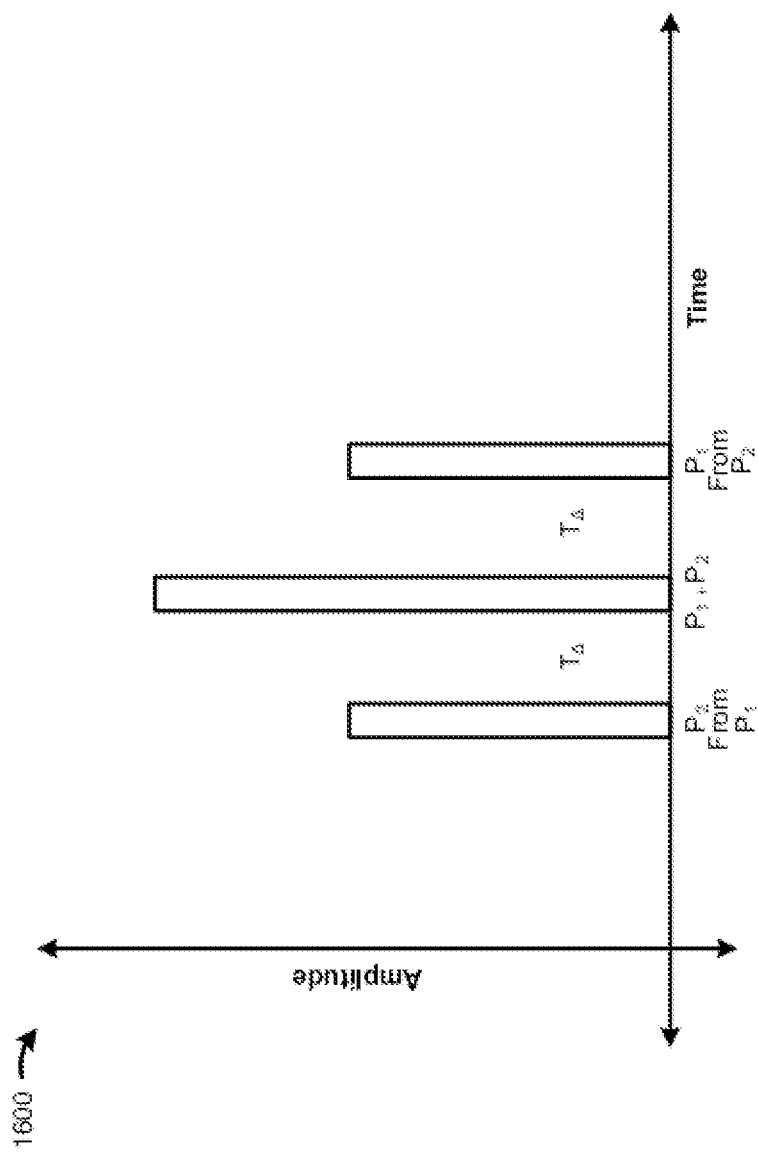

FIG. 16B then illustrates how, as time progresses, the amplitudes of the transmissions at some point overlap at the receiver (P1+P2) resulting in constructive interference of the signals. This constructive interference is the heart of how a single non-directional emitter is capable of generating signal gains.

Figure 17:
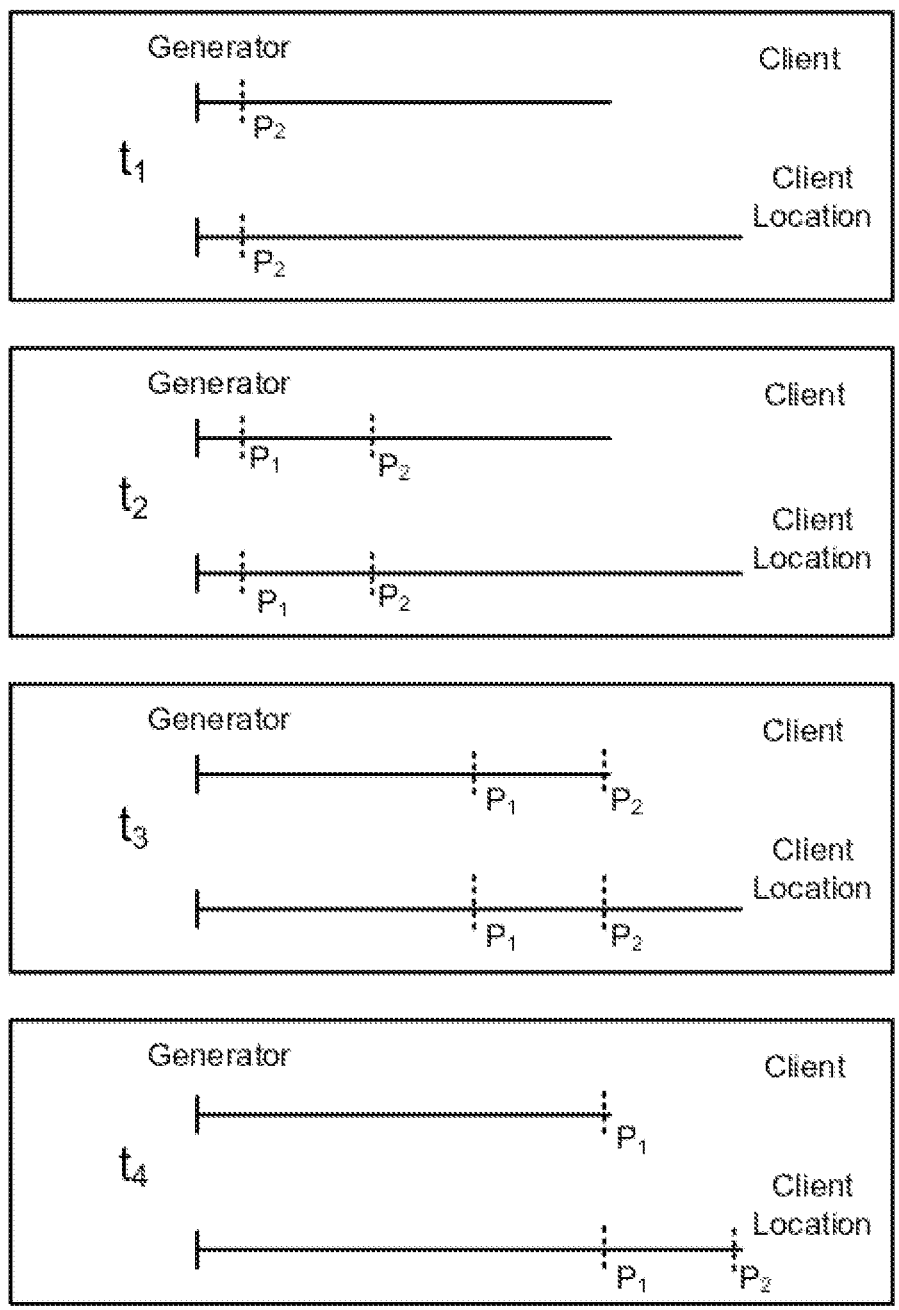
FIG. 17 depicts a series of example graphs over time of transmissions between a signal generator and a receiver in accordance with some embodiments.

FIG. 17 provides a series of graphs over time where the two signals are transmitted over the two pathways. The end of the pathways is at the receiver. At time 1, the second transmission (P2) is transmitted via both pathways. At time 2 the first transmission (P1) is transmitted. At time 3, the second signal (P2) reaches the endpoint via the first (shorter) pathway. At time 4, however, the second signal (P2) is received at the end point via the longer second pathway, at the same time the first signal (P1) arrives via the first shorter pathway. These signals P1 and P2 are combined or added to generate an amplified signal (assuming proper phase).

Figure 18:
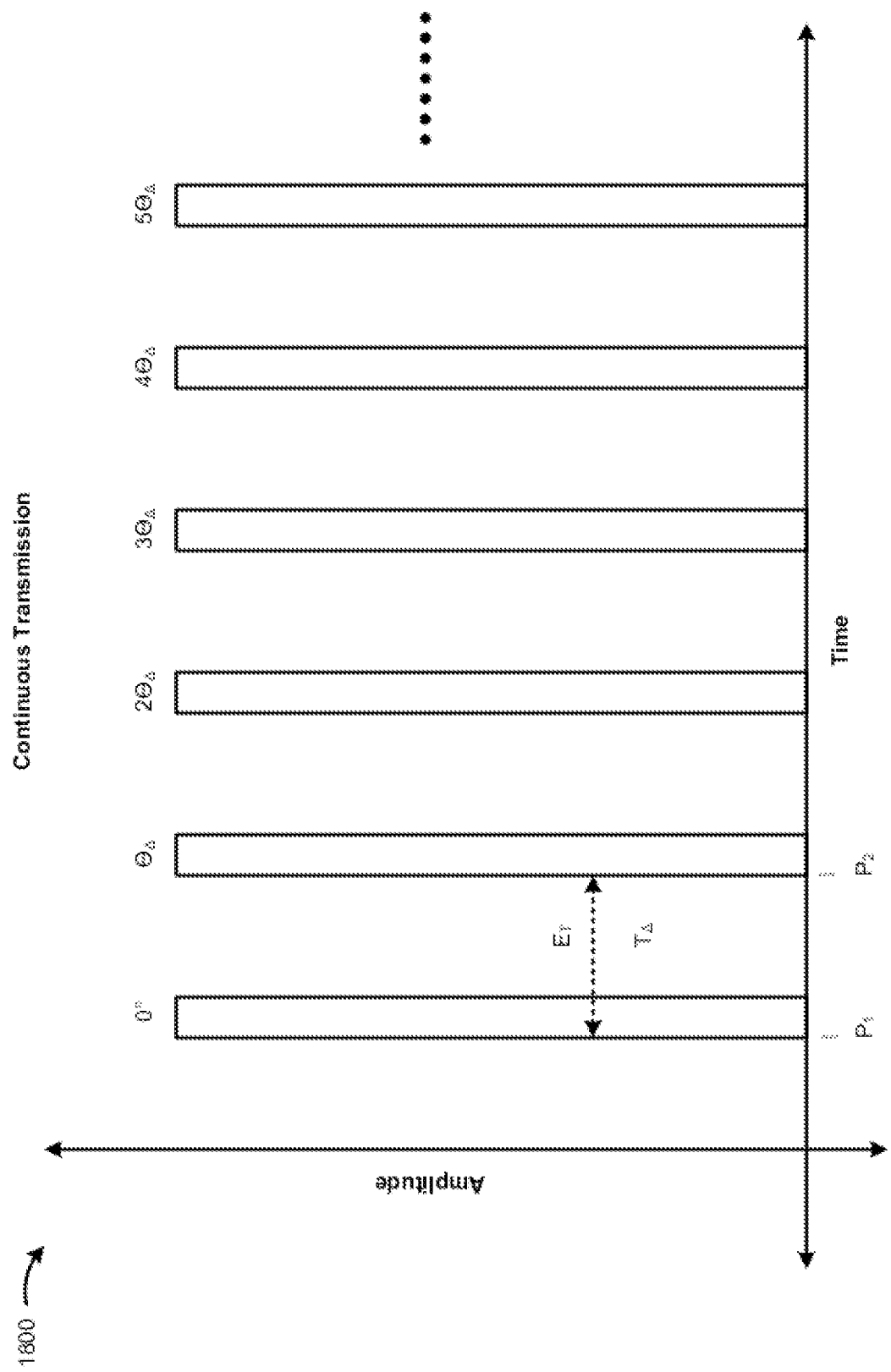
FIGS. 18-20 depict example graphs of amplitude over time for example pulsed and continuous transmissions in accordance with some embodiments.

Thus, in order to capitalize on the constructive interference, a continuous transmission may be employed where the phase is continually shifted by the phase differential θ every pathway period between the main transmission path and the secondary pathway (indicated as the time differential ΔT). FIG. 18 provides an example illustration of such a transmission schedule. With only two pulses transmitted, it is possible to have amplification, or focusing, only in a limited time period and then the signal level drops back to what it was from a single path. However, with a virtually unlimited number of pathways it is possible to continually modulate the signal phase in order to maintain nearly continuous (or prolonged) periods of signal focusing.

Figure 19:
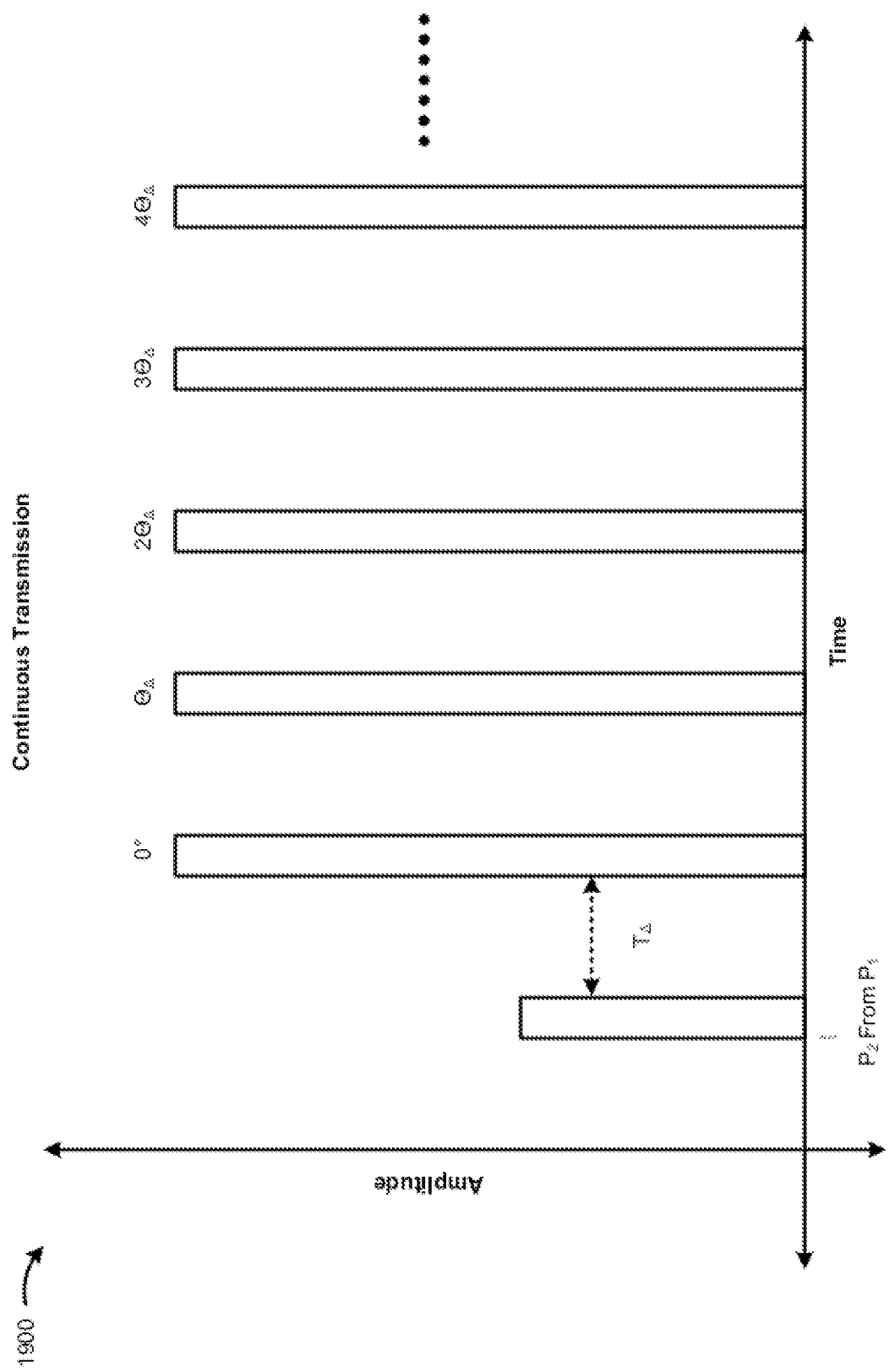

In FIG. 19 the received pulses are shown as adding up, resulting in repeated focusing of the signal. Notice that even though this example system is getting repeated focusing, at all time intervals, there are times where the pulse is off entirely, and the received signal is still in pulsed form.

Figure 20:
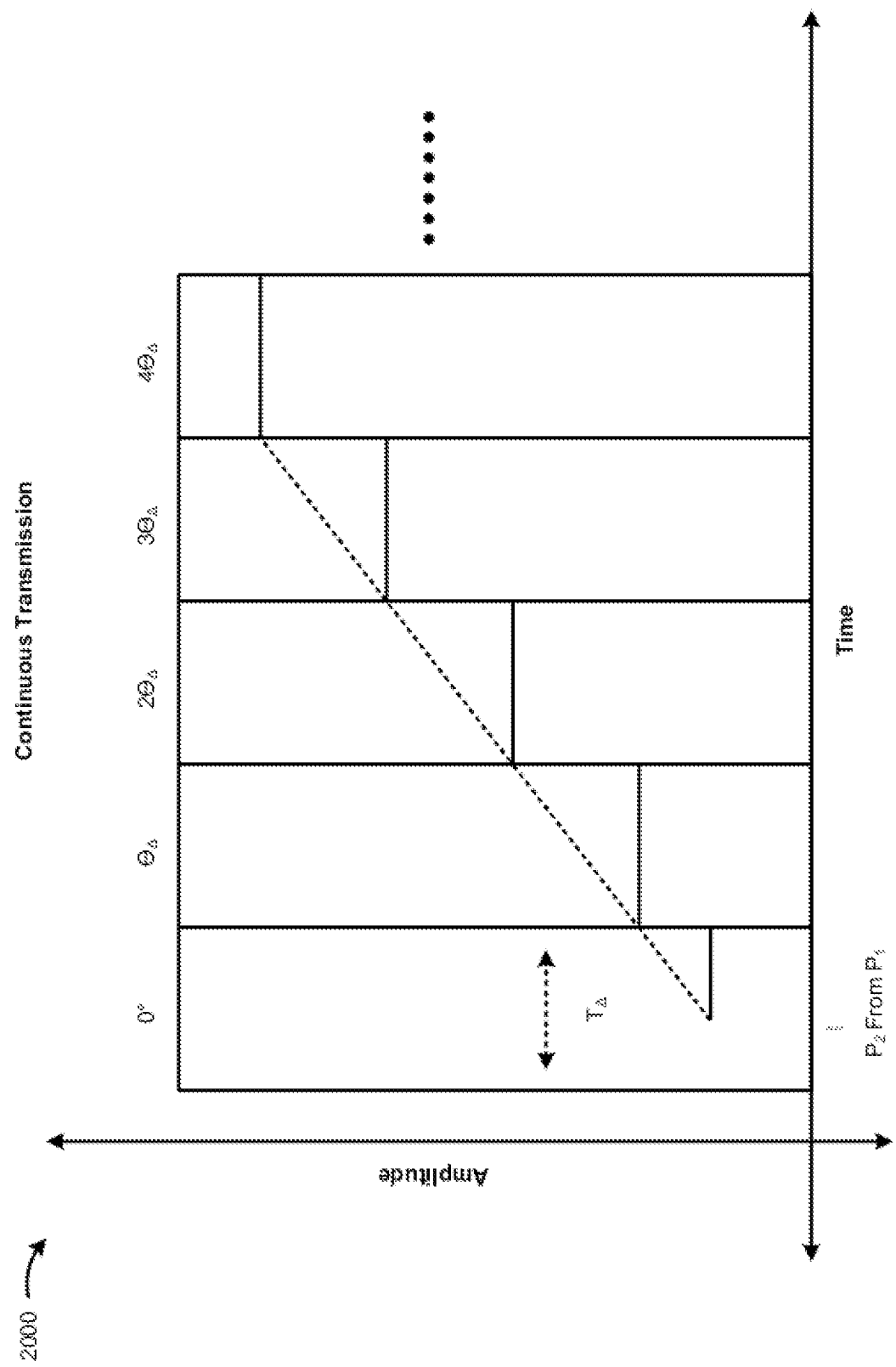
Figure 21:
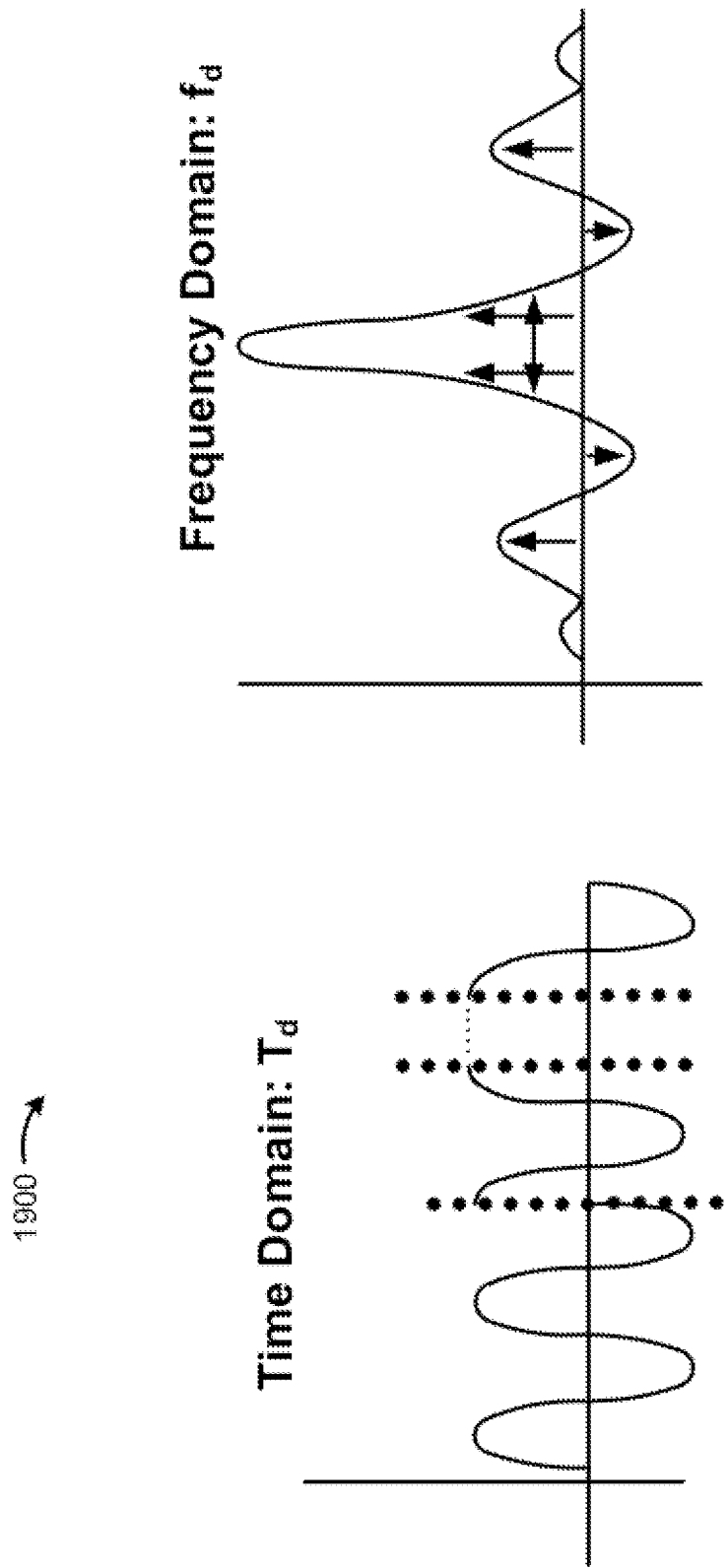
FIG. 21 depicts an example graph of example transmissions in the time domain and frequency domain in accordance with some embodiments.

In contrast, at FIG. 20, the pulse width is increased in a controlled manner in order to generate a completely continuous signal. The received signal will increase in amplitude until a final focused maximum is reached, in optimal environments. FIG. 20 illustrates the pulsed signals utilized to generate the continuous signal of FIG. 21. Note how the phases change as new pulses start. The corresponding frequency domain version of this signal is also shown.

Figure 22:
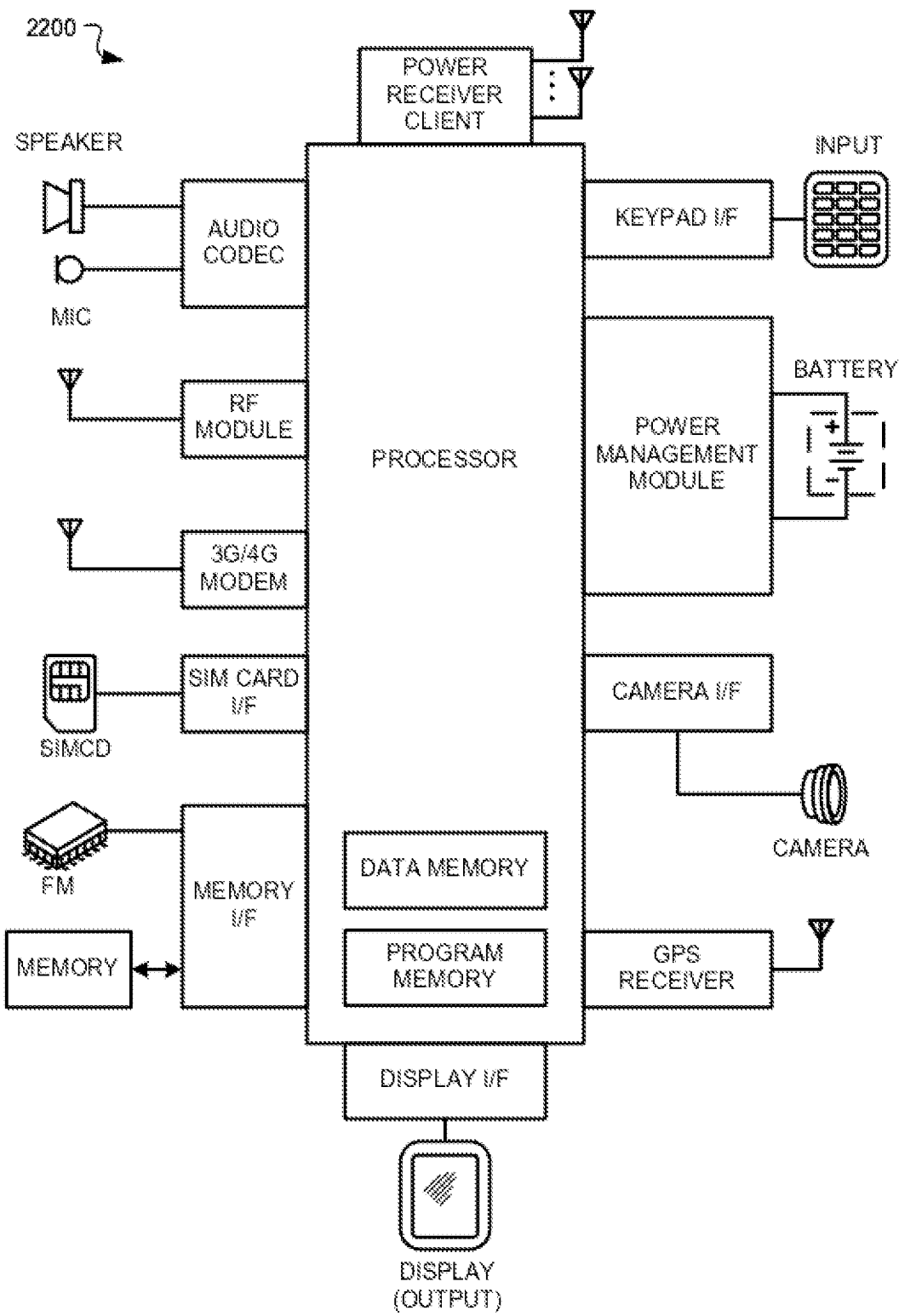
FIG. 22 depicts a block diagram illustrating example components of a representative mobile device or tablet computer with one or more wireless power receiver clients in the form of a mobile (or smart) phone or tablet computer device in accordance with some embodiments.

FIG. 22 depicts a block diagram illustrating example components of a representative mobile device or tablet computer 2200 with a wireless power receiver or client in the form of a mobile (or smart) phone or tablet computer device, according to an embodiment. Various interfaces and modules are shown with reference to FIG. 22, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 23:
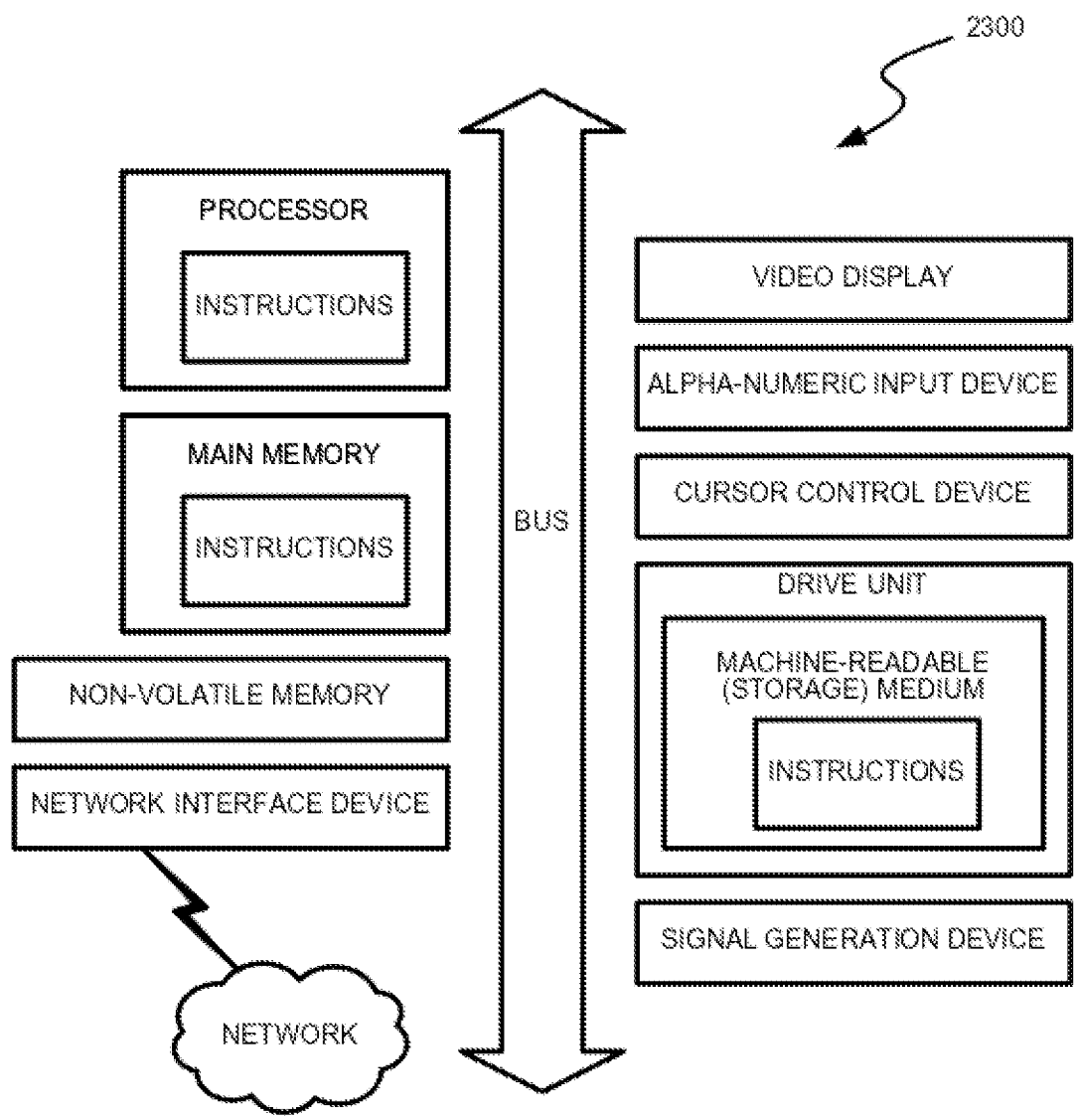
FIG. 23 depicts a diagrammatic representation of a machine, in the example form, of a computer system within which a set of instructions, for causing the machine to perform any one or more of the methodologies discussed herein, may be executed.

FIG. 23 depicts a diagrammatic representation of a machine, in the example form, of a computer system within which a set of instructions, for causing the machine to perform any one or more of the methodologies discussed herein, may be executed.

In the example of FIG. 23, the computer system includes a processor, memory, non-volatile memory, and an interface device. Various common components (e.g., cache memory) are omitted for illustrative simplicity. The computer system 2300 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 23 reside in the interface.

In operation, the computer system 2300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(1), other aspects may likewise be embodied as a means-plus-function claim, or in other forms, such as being embodied in a computer-readable medium. (Any claims intended to be treated under 35 U.S.C. § 112(1) will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A system comprising:
   an antenna array; and
   a controller coupled to the antenna array, and configured to:
      identify a phase and timing of a first signal received from a wireless device by a first antenna of the antenna array;
      determine, based on the identified phase and timing, transmission settings for at least a second antenna of the same antenna array; and
      generate, according to the transmission settings, a second signal for focusing, by the at least the second antenna, on the wireless device,
         wherein to generate the second signal, the controller is further configured to inverse the identified timing for reception of the second signal by the wireless device.

2. The system of claim 1, wherein the controller is further configured to direct the at least the second antenna to transmit the second signal focused on the wireless device.

3. The system of claim 1, wherein the first signal is received by the first antenna at a first frequency, and wherein the controller is further configured to direct the at least the second antenna to transmit the second signal to the wireless device at a second frequency different from the first frequency.

4. The system of claim 3, wherein the second frequency is a frequency sufficient for wireless power delivery to the wireless device.

5. The system of claim 1, wherein the first antenna is capable of receiving the first signal from the wireless device via at least two incoming signal paths in a multipath signaling environment, and wherein the controller is further configured to generate the second signal for focusing by the at least the second antenna on the wireless device using at least one reverse path of the at least two incoming signal paths.

6. The system of claim 1, wherein the controller is further configured to direct the at least the second antenna to transmit the second signal to the wireless device via at least one reverse path.

7. The system of claim 1, wherein the first antenna is capable of receiving the first signal from the wireless device via at least two signal paths in a multipath signaling environment.

8. The system of claim 7, wherein to inverse the identified timing, the controller is further configured to inverse the identified timing for simultaneous reception of the second signal by the wireless device over the at least two signal paths.

9. A method comprising:
identifying timing and a phase of a first signal received from a wireless device by a first antenna of an antenna array;
determining based on the identified timing and the phase, transmission settings for at least a second antenna of the same antenna array; and
generating, according to the transmission settings, a second signal for focusing, by the at least the second antenna, on the wireless device,
wherein the generating comprises inversing the identified timing for reception of the second signal by the wireless device.

10. The method of claim 9 further comprising transmitting, by the at least the second antenna, the second signal focused on the wireless device.

11. The method of claim 9 further comprising receiving, by the first antenna, the first signal from the wireless device.

12. The method of claim 11, wherein the receiving comprises receiving the first signal at a first frequency.

13. The method of claim 12 further comprising transmitting, by the at least the second antenna and at a second frequency different from the first frequency, the second signal to the wireless device.

14. The method of claim 11, wherein the receiving comprises receiving the first signal from the wireless device via at least two incoming signal paths in a multipath signaling environment.

15. The method of claim 14, wherein the generating comprises generating the second signal for focusing by the at least the second antenna on the wireless device using at least one reverse path of the at least two incoming signal paths.

16. The method of claim 15 further comprising transmitting, by the at least the second antenna, the second signal to the wireless device via the at least one reverse path.

17. The method of claim 9 further comprising receiving, by the first antenna, the first signal from the wireless device via at least two signal paths in a multipath signaling environment.

18. The method of claim 17, wherein the inversing comprises inversing the identified timing for simultaneous reception of the second signal by the wireless device over the at least two signal paths.

19. A system comprising:
a first transceiver; and
a second transceiver including: an antenna array, and a controller coupled to the antenna array, the controller configured to:
identify timing and a phase of a first signal received from the first transceiver via a first antenna of the antenna array;
determine based on the identified timing and the phase, transmission settings for at least a second antenna of the antenna array; and
generate, according to the transmission settings, a second signal for focusing, by the at least the second antenna, on the first transceiver,
wherein to generate the second signal, the controller is further configured to inverse the identified timing for reception of the second signal by the first transceiver.

20. The system of claim 19, wherein the first antenna is capable of receiving the first signal from the first transceiver via at least two signal paths in a multipath signaling environment, and wherein to inverse the identified timing, the controller is further configured to inverse the identified timing for simultaneous reception of the second signal by the first transceiver over the at least two signal paths.

* * * * *